United States Patent
Koide

(10) Patent No.: US 6,693,656 B1
(45) Date of Patent: Feb. 17, 2004

(54) LASER PROCESSING METHOD, METHOD FOR MANUFACTURING INK JET RECORDING HEAD USING SUCH METHOD OF MANUFACTURE, AND INK JET RECORDING HEAD MANUFACTURED BY SUCH METHOD OF MANUFACTURE

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,913

(22) Filed: Jun. 28, 2000

(30) Foreign Application Priority Data

Jun. 30, 1999 (JP) .......................................... 11-184590
Jun. 30, 1999 (JP) .......................................... 11-184696
Nov. 8, 1999 (JP) .......................................... 11-316760
Nov. 8, 1999 (JP) .......................................... 11-316818
Nov. 8, 1999 (JP) .......................................... 11-316850

(51) Int. Cl.⁷ .............................. B41J 2/435; B41J 2/05
(52) U.S. Cl. ...................................... 347/224; 347/65
(58) Field of Search ............................ 347/40, 45, 47, 347/65, 224, 225; 219/121.4, 121.68, 121.69, 121.7; 505/410, 412

(56) References Cited

U.S. PATENT DOCUMENTS

| 4,504,726 A | * | 3/1985 | Hosak et al. ........... 219/121.68 |
| 5,208,604 A | | 5/1993 | Watanabe et al. ............. 347/47 |
| 5,296,674 A | | 3/1994 | Praschek et al. ....... 219/121.69 |
| 5,312,396 A | | 5/1994 | Feld et al. ..................... 606/11 |
| 5,656,186 A | | 8/1997 | Mourou et al. ........ 219/121.69 |
| 5,720,894 A | | 2/1998 | Neev et al. ..................... 216/65 |
| 5,786,560 A | | 7/1998 | Tatah et al. ............ 219/121.77 |
| 5,808,644 A | * | 9/1998 | Imamura et al. .............. 347/93 |

FOREIGN PATENT DOCUMENTS

| DE | 197 36 110 A1 | 3/1999 |
| EP | 0 309 146 A2 | 3/1989 |
| EP | 0 552 058 A1 | 1/1993 |
| EP | 0 542 656 A1 | 5/1993 |
| EP | 0 836 906 A1 | 4/1998 |
| JP | 2-121842 | 5/1990 |
| JP | 2-121845 | 5/1990 |
| WO | WO 98/55035 | 12/1998 |

* cited by examiner

*Primary Examiner*—Hai Pham
(74) *Attorney, Agent, or Firm*—Fitzpatrick, Cella, Harper & Scinto

(57) ABSTRACT

A laser processing method for performing laser ablation process on a work piece by radiating laser beam on the work piece includes the step of forming simultaneously a plurality of process shapes arranged at a predetermined interval by use of laser beam of plural pulses having extremely large spatial and temporal energy density radiated from a laser oscillator as the laser beam oscillating at the pulse radiation time of one picosecond or less. With the laser processing method thus structured, it is possible to perform a highly precise processing without creating by-product, as well as to fundamentally prevent the converted thermal energy from being accumulated on a work piece, such as resin, which causes the work piece to be fused or thermally expanded during the operation of laser processing.

24 Claims, 17 Drawing Sheets

LASER PROCESSING METHOD, METHOD FOR MANUFACTURING INK JET RECORDING HEAD USING SUCH METHOD OF MANUFACTURE, AND INK JET RECORDING HEAD MANUFACTURED BY SUCH METHOD OF MANUFACTURE

BACKGROUND OF THE INVENTION

1. Field of the Invention

The present invention relates to a laser processing method. More particularly, the invention relates to a method of manufacture that uses such laser processing, for example, to manufacture an ink jet recording head for enabling ink droplets to fly and adhere to a recording medium, and also, relates to an ink jet recording head manufactured by such method of manufacture.

2. Related Background Art

Conventionally, there has been known the laser processing method that uses ultraviolet laser in order to precisely process a structural object that requires minute structures formed in high precision.

As an example of such precise processing, there is such one as processing ink flow paths or ink discharge ports of an ink jet head.

In the specification of Japanese Patent Application Laid-Open No. 2-121842 or 2-121845, is disclosed the high precision processing of ink flow paths or ink discharge ports using excimer layer, the typical ultraviolet laser.

In other words, the excimer laser can oscillate ultraviolet rays of short pulses (15 to 35 ns) by the discharge excitation of a mixed gas of rare gas and halogen. The oscillation energy thereof is 100 mJ/pulse, and pulse repetition frequency is 10 to 500 Hz. Then, when the highly bright ultraviolet rays, such as the excimer layer, are radiated on the surface of resin polymer, the ablative photodecompotion (APD) process occurs to decompose such portion to be scattered instantaneously with plasma emission and impact noises, thus making it possible to perform the so-called laser ablation process of polymer resin.

With the YAG laser which has been generally in use as a laser processing, edge faces tend to become rough, although drilling is possible. Also, the $CO_2$ laser, which is infrared, has a drawback that crater is made on the circumference of each hole. Here, the laser processing of the kind is the so-called laser heat process, which is executed by transforming light energy into thermal energy. As a result, the processed shape is liable to be collapsed to make precise processing difficult. In contrast, the ablation process that uses excimer laser performs sublimation etching by means of the photochemical reaction that cuts the covalent binding of carbon atoms. Therefore, processed shape is not easily collapsed, hence making it possible to execute an extremely precise processing.

Here, the ablation process means a method for performing sublimation process by use of laser without conditioning any liquid phase.

Particularly, in the field of ink jet technologies and techniques, the practical use of laser ablation process has remarkably developed in recent years as fresh in the memory of those skilled in the art.

Further, while practicing the laser process using excimer laser, the following has been found: in other words, the oscillating pulses of radiated laser is approximately several tens of nano seconds per pulse for the excimer layer, that is, the aforesaid ultraviolet laser, while the ultraviolet harmonic oscillation of YAG laser is approximately 100 pico seconds to several nano seconds. However, the light energy of the laser beams radiated on a work piece is not necessarily used all for cutting the covalent binding of atoms.

Then, because of the existence of light energy which is not used for cutting the covalent binding of atoms, the laser processed portion of a work piece is scattered before being completely decomposed. Thus, a by-product is created on the circumference of the processed portion.

Also, a part of light energy which is not used for cutting the covalent binding of atoms is converted into thermal energy.

The energy density of excimer laser reaches only a 100-megawatt level at the maximum in terms of oscillating pulses. Therefore, it becomes difficult to process. metal, ceramics, and minerals (such as silicon) having high ratio of heat transfer, and quartz and glass having low light absorptance. Mainly, organic resin materials can be processed by use of sublimating ablation.

These have been unavoidable phenomena that may take place when using excimer laser. Therefore, various processing techniques have been proposed so that these phenomena do not produce unfavorable influences on the recording heads to be used actually.

For example, if an ink jet recording head is assembled with the aforesaid by-product yet to be eliminated, it may cause clogging of discharge ports. Here, a processing step should be provided additionally in order to remove the by-product.

Also, with a part of light energy being converted into thermal energy, a work piece may be caused to expand while it is processed or there is a fear that the work piece tends to be partly fused. Therefore, a material having a high glass transition point or a material having a lower processing pitch should be used.

Nevertheless, as described above, no fundamental solution has been given to any one of these techniques. The actuality is, therefore, that various restrictions should be imposed upon laser processing.

On the other hand, for the ink jet recording head described above, it has been required to provide highly precise images in recent years. For that matter, whereas the arrangement density of 300 to 400 dpi should be good enough conventionally, it is now demanded to provide that of 600 dpi or as high as 1,200 dpi in recent years.

Under the circumstances, the arrangement intervals of discharge ports and recording liquid flow paths should be processed in higher precision at extremely small intervals of 50 μm or less or in the extremely small diameter of 20 μm or less.

However, since the phenomena observable for the excimer laser processing as described above become more conspicuous as the process intervals or process diameters become smaller, there has begun a limit in using it for manufacturing a head of such a highly precise type as described earlier.

In this respect, the inventors hereof have recognized that the aforesaid phenomena are brought about by the laser ablation processing using the ultraviolet laser which is typically represented by the excimer laser, and assiduously made studies from the new point of view completely free from the conventional art. As a result, the fundamental solution has been found to eliminate these phenomena, and a revelational laser ablation processing technique has been found, which can deal with the microprocessing that makes further progress from now on, and which contributes to enhancing the versatility of such technique.

SUMMARY OF THE INVENTION

The present invention is designed with a view to solving the technical problems discussed above. It is an object of the invention to provide a laser processing method capable of performing a highly precise processing without creating by-product, while preventing fundamentally the thermal energy converted during the operation of laser processing from being accumulated on a work piece, such as resin, without fusing the work piece or causing thermal expansion, and also to provide a method for manufacturing an ink jet recording head using such laser processing method, as well as an ink jet recording head manufactured by such method of manufacture.

It is another object of the invention to provide a laser processing method capable of performing processing with simple and easy steps when processing a precise structural member formed by materials of plural kinds to be provided for a work pieces, and also, to provide a method for manufacturing an ink jet recording head using such laser processing method, as well as an ink jet recording head manufactured by such method of manufacture.

Also, it is still another object of the invention to provide a laser processing method which makes it possible to simplify the alignment step, and also, implement to increase the positional precision of the inner structural member or the like, while reducing the costs of manufacture, among some others, and also, to provide a method for manufacturing an ink jet recording head using such laser processing method, as well as an ink jet recording head manufactured by such method of manufacture.

It is a further object of the invention to provide a laser processing method capable of structuring a work piece to absorb the radiated energy of laser in order to attempt the enhancement of processing efficiency, and also, to provide a method for manufacturing an ink jet recording head using such laser processing method, as well as an ink jet recording head manufactured by such method of manufacture.

In order to achieve these objectives, the present invention provides the laser processing method structured in the following paragraphs from (1) to (48). It also provides a method for manufacturing an ink jet recording head using such laser processing method, and an ink jet recording head manufactured by such method of manufacture.

(1) A laser processing method for performing laser ablation process on a work piece by radiating laser beam on the work piece comprises the step of-forming simultaneously a plurality of process shapes arranged at a predetermined interval by use of laser beam of plural pulses having extremely large spatial and temporal energy density radiated from a laser oscillator as the laser beam oscillating at the pulse radiation time of one picosecond or less.

(2) For the laser processing method described in the above paragraph (1), the material used is resin, Si, or Si compound material.

(3) A laser processing method comprises the steps of converging and irradiating with predetermined energy density the laser beam of plural pulses having large spatial and temporal energy density radiated from a laser oscillator oscillating at the pulse radiation time of one picosecond or less onto a work piece formed by different materials of two kinds or more; and performing sublimating processing of the different materials of two kinds or more in one and the same step almost simultaneously.

(4) For the laser processing method described in the above paragraph (3), the work piece used is formed by different materials of two kinds or more in a bonded state, and then, the work piece is processed by sublimation almost simultaneously in one and the same step without creating warping.

(5) For the laser processing method described in the above paragraph (3), the different materials of two kinds or more are formed by an arbitrary combination of organic resin material, metallic material, inorganic compound material, glass material, mineral material, and the like.

(6) A laser processing method for performing laser ablation processing by irradiating laser beam to a work piece comprises the steps of using laser beam of plural pulses having extremely large spatial and temporal energy density radiated from a laser oscillator as the laser bemas oscillating at the pulse radiation time of one picosecond or less to converge beam with more than predetermined energy density inside a transparent work piece with respect to the light wavelength of the laser beam; and processing the work piece by sublimation.

(7) A laser processing method for performing laser ablation processing by irradiating laser beam to a work piece comprises the steps of using laser beam of plural pulses having extremely large spatial and temporal energy density radiated from a laser oscillator as the laser beam oscillating at the pulse radiation time of one picosecond or less to be passed through an almost transparent material (A) with respect to the light wavelength of the laser beam, having lower light absorptance, and radiating the laser beam on a material (B) positioned inside the work piece, having higher light absorptance with respect to the light wavelength of the laser beam than that of the material (A); and processing the material (B).

(8) For the laser processing method described in the above paragraph (6), when a structural member is processed by sublimation inside a work piece, a discharge port is formed in advance to discharge to the outside the by-product created by sublimation and evaporation caused by the processing the structural member is processed.

(9) For the laser processing method described in the above paragraph (8), when the structural member is processed, this member is processed in a position close to the discharge port.

(10) For the laser processing method described in either one of the above paragraphs (1) to (9), when processing is performed, the work piece is colored by mixing therein a dye for absorbing wavelength in a domain corresponding to the oscillating wavelength of the laser beam, and processed.

(11) The wavelength of the laser beam is within a domain of 350 to 1000 nm for the laser processing method described in either one of the above paragraphs (1) to (10).

(12) For a laser processing method described in either one of the above paragraphs (1) to (11), the pulse radiation time of the laser beam is set at 500 femtoseconds or less.

(13) For a laser processing method described in either one of the above paragraphs (1) to (11), the laser oscillator is the one which is provided with a spatial compression device for propagating beam.

(14) For a laser processing method described in the above paragraph (13), the spatial compression device for propagating beam comprises chirping pulse generating means and longitudinal mode synchronous means utilizing light wavelength dispersion characteristics.

(15) For the laser processing method described in the above paragraph (13), the spatial compression device for propagating beam is structured using charping pulse generating means and the longitudinal mode synchronous method utilizing the light wavelength dispersion characteristic of diffraction phase grating.

(16) A method for manufacturing an ink jet recording head having a member for forming at least a part of ink passage for ink to flow to be processed by laser beam, provided with an ink discharge port for discharging ink droplet adhering to a recording medium; a liquid chamber for retaining ink to be supplied to the discharge port; an ink flow path communicated with the discharge port and the liquid chamber; an energy generating element arranged for a part of the ink flow path for generating energy for discharging ink; and an ink supply port for supplying ink from the outside into the liquid chamber, comprises the step of forming recessed portion becoming a part of the ink passage or through hole by use of laser beam of plural pulses having extremely large spatial and temporal energy density radiated from a laser oscillator as the laser beam oscillating at the pulse radiation time of one picosecond or less.

(17) For the method for manufacturing an ink jet recording head described in the above paragraph (16), the recessed portion or through holes becoming a part of the ink passage are formed in plural numbers at a predetermined pitch simultaneously by radiating laser beam through a mask having plural openings formed at a predetermined space.

(18) For the method for manufacturing an ink jet recording head described in the above paragraph (16) or (17), the member forming at least a part of the ink passage is formed by resin.

(19) For the method for manufacturing an ink jet recording head described in the above paragraph (16) or (17), the member forming at least a part of the ink passage is formed by Si or Si compound material.

(20) For the method for manufacturing an ink jet recording head described in either one of the above paragraphs (17) to (19), the recessed portion is a groove becoming the ink flow path.

(21) For the method for manufacturing an ink jet recording head described in either one of the above paragraphs (17) to (19), the through hole becomes the discharge port.

(22) A method for manufacturing an ink jet recording head having a member for forming at least a part of ink passage for ink to flow to be formed by different materials of two kinds or more, the member formed by different materials of two kinds or more being processed by laser beam, provided with an ink discharge port for discharging ink droplets adhering to a recording medium; a liquid chamber for retaining ink to be supplied to the discharge port; an ink flow path communicated with the discharge port and the liquid chamber; an energy generating element arranged for a part of the ink flow path for generating energy for discharging ink; and an ink supply port for supplying ink from the outside into the liquid chamber, comprises the step of processing the member formed by different materials of two kinds or more by sublimation almost simultaneously in one and the same step by use of laser beam of plural pulses having extremely large spatial and temporal energy density radiated from a laser oscillator as the laser beam oscillating at the pulse radiation time of one picosecond or less.

(23) For the method for manufacturing an ink jet recording head described in the above paragraph (22), the member formed by different materials of two kinds or more is structured in a bonded state constituting at least a part of ink passage of an ink jet recording head, and processed by sublimation almost simultaneously in one and the same step without creating warping.

(24) For the method for manufacturing an ink jet recording head described in the above paragraph (22) or (23), the different materials of two kinds or more are an arbitrary combination of organic resin material, metallic material, inorganic compound material, glass material, mineral material and the like.

(25) A method for manufacturing an ink jet recording head having a member for forming at least a part of ink passage for ink to flow to be formed in a transparent ink flow path formation member and processed by laser beam, provided with an ink discharge port for discharging ink droplets adhering to a recording medium; a liquid chamber for retaining ink to be supplied to the discharge port; an ink flow path communicated with the discharge port and the liquid chamber; an energy generating element arranged for a part of the ink flow path for generating energy for discharging ink; and an ink supply port for supplying ink from the outside into the liquid chamber, comprises the steps of using laser beam of plural pulses having extremely large spatial and temporal energy density radiated from a laser oscillator as the laser beam oscillating at the pulse radiation time of one picosecond or less to converge beam with more than predetermined energy density inside the transparent ink flow path formation member with respect to the light wavelength of the laser beam; and processing an ink flow path and others by sublimation.

(26) A method for manufacturing an ink jet recording head having a member for forming at least a part of ink passage for ink to flow to be formed by a substantially transparent material (A) having low light absorptance of laser beam, and a material (B) having higher light absorptance than that of the material (A) and positioned inside a work piece, and processed by the laser processing method, provided with an ink discharge port for discharging ink droplets adhering to a recording medium; a liquid chamber for retaining ink to be supplied to the discharge ports; an ink flow path communicated with the discharge port and the liquid chamber; an energy generating element arranged for a part of the ink flow path for generating energy for discharging ink; and an ink supply port for supplying ink from the outside into the liquid chamber, comprises the steps of using laser beam of plural pulses having extremely large spatial and temporal energy density radiated from a laser oscillator as the laser beam oscillating at the pulse radiation time of one picosecond or less to pass beam the material (A) having low light absorptance of the laser beam, and radiate beam on the material (B) having higher light absorptance than that of the material (A) and positioned inside the work piece; and processing the material (B) by sublimation.

(27) For the method for manufacturing an ink jet recording head described in the above paragraph (25) or (26), when the ink flow path and others are processed, a discharge port is formed in advance to discharge to the outside the by-product created by the sublimation and vaporization of the processing, and then, the ink flow path and others are processed.

(28) For the method for manufacturing an ink jet recording head described in the above paragraph (27), when the ink flow path and others are processed, the ink flow path and other are processed in a position close to the discharge port.

(29) For the method for manufacturing an ink jet recording head described in either one of the above paragraphs (16) to (28), the work piece is colored by mixing therein a dye for absorbing wavelength in a domain corresponding to the oscillating wavelength of the laser beam, and processed.

(30) For the method for manufacturing an ink jet recording head described in either one of the above paragraphs (16)

to (29), the wavelength of the laser beam is within a domain of 350 to 1000 nm.

(31) For the method for manufacturing an ink jet recording head described in either one of the above paragraphs (16) to (30), the pulse radiation time of the laser beam is 500 femtoseconds or less.

(32) For the method for manufacturing an ink jet recording head described in either one of the above paragraphs (16) to (31), the laser oscillator is a laser oscillator provided with a spatial compression device for propagating beam.

(33) For the method for manufacturing an ink jet recording head described in the above paragraph (32), the spatial compression device for propagating beam comprises chirping pulse generating means and longitudinal mode synchronous means utilizing light wavelength dispersion characteristics.

(34) For the method for manufacturing an ink jet recording head described in the above paragraph (32), the spatial compression device for propagating beam is structured using charping pulse generating means and the longitudinal mode synchronous method utilizing the light wavelength dispersion characteristic of diffraction phase grating.

(35) An ink jet recording apparatus having a member for forming at least a part of ink passage to be processed by laser beam, provided with an ink discharge port for discharging ink droplets adhering to a recording medium; a liquid chamber for retaining ink to be supplied to the discharge port; an ink flow path communicated with the discharge port and the liquid chamber; an energy generating element arranged for a part of the ink flow path for generating energy for discharging ink; and an ink supply port for supplying ink from the outside into the liquid chamber, comprises a recessed portion or through hole becoming a part of the ink passage, to be formed by use of laser beam of plural pulses having extremely large spatial and temporal energy density radiated from a laser oscillator as the laser beam oscillating at the pulse radiation time of one picosecond or less.

(36) For the ink jet recording head described in the above paragraph (35), the recessed portion or through hole becoming a part of the ink passage are formed in plural numbers at a predetermined pitches simultaneously by radiating laser beam through a mask having plural openings formed at a predetermined pitches.

(37) For the ink jet recording head described in the above paragraph (35) or (36), the member forming at least a part of the ink passage is formed by resin.

(38) For the ink jet recording head described in either one of the above paragraphs (35) to (37), the member forming at least a part of the ink passage is formed by Si or Si compound material.

(39) For the ink jet recording head described in either one of the above paragraphs (36) to (38), the recessed portion is a groove becoming the ink flow path.

(40) For the ink jet recording head described in either one of the above paragraphs (36) to (39), the through hole becomes the discharge port.

(41) An ink jet recording head having a member for forming at least a part of ink passage to be formed by different materials of two kinds or more, the member formed by different materials of two kinds or more being processed by laser beam, provided with an ink discharge port for discharging ink droplets adhering to a recording medium; a liquid chamber for retaining ink to be supplied to the discharge port; an ink flow path communicated with the discharge port and the liquid chamber; an energy generating element arranged for a part of the ink flow path for generating energy for discharging ink; and an ink supply port for supplying ink from the outside into the liquid chamber, comprises the member having different materials of two kinds or more processed by sublimation almost simultaneously in one and the same step by use of laser beam of plural pulses having extremely large spatial and temporal energy density radiated from a laser oscillator as the laser beam oscillating at the pulse radiation time of one picosecond or less.

(42) For the ink jet recording head described in the above paragraph (41), the member formed by different materials of two kinds or more is structured in a bonded state constituting at least a part of ink passage of an ink jet recording head, and processed by sublimation almost simultaneously in one and the same step without creating warping.

(43) For the ink jet recording head described in the above paragraph (41) or (42), the different materials of two kinds or more are an arbitrary combination of organic resin material, metallic material, inorganic compound material, glass material, mineral material and the like.

(44) An ink jet recording head having a member for forming at least a part of ink passage to be formed in a transparent ink flow path formation member and processed by laser beam, provided with an ink discharge port for discharging ink droplets adhering to a recording medium; a liquid chamber for retaining ink to be supplied to the discharge port; ink flow path communicated with the discharge port and the liquid chamber; an energy generating element arranged for a part of the ink flow path for generating energy for discharging ink; and an ink supply port for supplying ink from the outside into the liquid chamber, comprises the member processed by sublimation by use of laser beam of plural pulses having extremely large spatial and temporal energy density radiated from a laser oscillator as the laser beam oscillating at the pulse radiation time of one picosecond or less to be converged with more than predetermined energy density inside the transparent ink flow path formation member with respect to the light wavelength of the laser beam.

(45) An ink jet recording head having a member for forming at least a part of ink passages to be formed by a substantially transparent material (A) having low light absorptance of laser beam, and a material (B) having higher light absorptance than that of the material (A) and positioned inside a work piece, and processed by the laser processing method, provided with an ink discharge port for discharging ink droplets adhering to a recording medium; a liquid chamber for retaining ink to be supplied to the discharge port; an ink flow path communicated with the discharge port and the liquid chamber; an energy generating element arranged for a part of the ink flow path for generating energy for discharging ink; and an ink supply port for supplying ink from the outside into the liquid chamber, comprises the member processed by sublimation by use of laser beam of plural pulses having extremely large spatial and temporal energy density radiated from a laser oscillator as the laser beam oscillating at the pulse radiation time of one picosecond or less to be passed through the material (A) having low light absorptance of the laser beam, and radiated on the material (B) having higher light absorptance than that of the material (A) and positioned inside the work piece.

(46) For the ink jet recording head described in the above paragraph (44) or (45), when the ink flow path and others are processed, a discharge port is formed in advance to discharge to the outside the by-product created by the sublimation and vaporization of the processing, and then, the ink flow path and others are processed.

(47) For the ink jet recording head described in the above paragraph (46), when the ink flow path and others are processed, the processing thereof is performed in a position close to the discharge port.

(48) The ink jet recording head described in either one of the above paragraphs (35) to (47) further comprises a member colored by mixing therein a dye for absorbing wavelength in a domain corresponding to the oscillating wavelength of the laser beam, and processed.

BRIEF DESCRIPTION OF THE DRAWINGS

FIG. 10A is the view of the principal part of the ink discharge portion for the plane type ink jet recording head, observed from the ink discharge surface; FIG. 10B is a cross-sectional view taken in line 10B—10B in FIG. 10A.

FIG. 11A is a plan view of an edge face discharging type ink jet recording head; FIG. 11B is a sectional view which is indicated by arrows, taken on the position 11B—11B in FIG. 11A.

DETAILED DESCRIPTION OF THE PREFERRED EMBODIMENTS

Figure 1A:
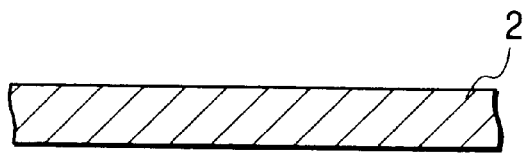
FIGS. 1A, 1B, 1C, 1D and 1E are views which schematically illustrate a method for processing ink discharge ports of an ink jet recording head in accordance with a first embodiment of the present invention.

By the application of the present invention structured as described above, it becomes possible to carry out processing in accordance with the embodiments thereof, which has never been attained by the conventional ablation process as discussed earlier.

In this respect, the oscillation density of the spacial and temporal energy, which is applicable to the structure of the present invention as laser beams, radiated from the laser oscillator is extremely large in terms of the pulse discharge time of one pico second or less. Such laser beams of plural pulses are disclosed in the "Compilation of Optotechnologies in the Next Generation" (in the first part: elemental technologies; generation and compression of ultrashort optical pulses, p.24 to p.31, published by Optoronics K.K. in 1992) or the like, which is the so-called femtosecond laser. Of the femtosecond laser currently available on the market in general, there is the one having the pulse emitting time of 150 fetomseconds or less with light energy of 500 microjouls per pulse. With the laser of the kind, the energy density of the radiated laser beams reaches approximately a 3-gigawatt level in terms of the oscillated pulses.

In other words, when the discharge ports of an ink jet recording head are manufactured by the ablation processing method using the conventional excimer laser or the like, for example, the width of pulse radiation time of laser beams is long so that the light energy absorbed into the resin plate used for the formation of the discharge ports is partly converted into thermal energy. Then, heat dispersion takes place on the entire body of the resin plate at given rate of conduction to allow the resin plate to expand. This expansion is further promoted as the etching process advances. The nozzles are directed outward eventually, and the edges are caused to slacken, thus making it impossible to discharge ink droplets straightly in parallel with each other.

In contrast, with the structure that uses laser oscillating in the pulse radiation time of one picosecond or less by use of the femtosecond laser described above, it becomes possible to increase the temporal energy density significantly at the time of laser processing. Thus, the ablation processing of a work piece of resin or the like is possible by the application of light energy in an extremely small quantity.

Also, with the application of the structure described above, almost no by-product is created at the time of laser processing. Therefore, it becomes possible to omit the processing step of removing by-product that has been required conventionally, and contribute to the significant enhancement of the productivity of ink jet recording heads.

Also, with the application of the structure described above, the light energy of laser beams radiated on a work piece, such as resin, is converted into thermal energy. However, before such thermal energy is accumulated on the work piece, the processing is completed. Therefore, it becomes possible to carry out highly precise processing with the solution of the problems that the processing precision is deteriorated due to the thermal expansion while the work piece is being processed or a part of the work piece is fused inevitably. If, for example, the ink passage is processed thereby, ink discharge ports are formed to be aligned in parallel in high density, hence making it possible to manufacture an ink jet recording head capable of discharging ink droplets straightly in parallel, and enhance the performance of the ink jet recording head significantly. In this respect, the ink passage means ink discharge ports, ink flow paths, a liquid chamber, an ink supply port, or the like which is the portion where ink passes as a whole and where each member is in contact with ink.

Also, with the application of the structure described above, the laser processing becomes possible for a work piece formed by different materials of two kinds or more by the convergent radiation of laser beams in a predetermined energy density with plural pulses having spacial and temporal energy density, which is radiated from the laser oscillator that oscillates at the pulse radiation time of one picosecond or less. In this way, the different materials of two kinds or more can be processed by sublimation in one and the same process almost simultaneously.

Also, with the application of structure described above, it becomes possible to intensify energy for easier processing of metal, ceramics, or minerals (such as silicon) having high coefficient of heat transfer. Also, for the glass or quartz having low light absorptance or for optical crystal, it becomes possible to effectuate processing if only the object has the absorption of 0.1 to 1.0%, because the density of light energy reaches the gigawatt range to make it an energy density of 10 to 100 times or more the excimer laser. Therefore, such various materials as described earlier can be processed by sublimating ablation almost equally. The different materials of two kinds or more can be processed in one step of irradiating ultrashort pulse laser, thus processing a complex material almost simultaneously to form a structural member in one processing step. Further, even if the different materials of two kinds or more, which present a large difference between linear expansion coefficients thereof, it becomes possible to suppress the peeling between different materials due to the stress that may be caused by thermal expansion, because heat is not easily transferred during the ablation processing as compared with the conventional art.

Here, also, the light wavelength of laser in use, which is radiated at the pulse radiation time of one picosecond or less, is not necessarily that of ultraviolet as the characteristics of the laser oscillator. If only the wavelength can be absorbed by a work piece, it may be a visible light or infrared light, because the temporal beam density is extremely large so that material can be sublimated in a short period of time for processing, hence making it possible to effectuate the ablation processing without conditioning the liquid phase.

Also, with the application of the structure described above to the manufacturing process of an ink jet recording head, it becomes possible to effectuate the ablation processing in one step of laser processing almost at a time for the structural member of a recording head formed by inorganic material, glass material, metallic material, semiconductor material, or an arbitrary combination of these materials, not necessarily limiting the materials to polyimide, polysulfone, or some other resin material that has been used for structuring the ink discharge ports, ink flow paths, an ink liquid chamber, or an ink supply port of the conventional ink jet head in general. Therefore, with the application thereof, it becomes possible to give more freedom in complex selection of materials for the structure of ink discharge ports, ink flow paths, ink liquid chamber or ink supply port. Also, if, for example, the material having smaller thermal expansion, such a complex material of metal and resin or glass and resin, is used for structuring the orifice plate or ink flow paths, it becomes possible to eliminate the deviation of the contact surface of each member that may be brought about by shearing force. Further, if an ink jet recording head or a printer is formed by the materials which are not easily subjected to the influences of temperature changes (environmental changes), it becomes possible to transport the heads or printers on board a vessel that may even cross the equator. Here, the costs of distribution can be reduced. Also, an ink jet recording head can be manufactured with an excellent durability and storage capability, which is not easily eroded even by ink having strong alkaline property, if a complex material of ceramics or glass is made usable.

Also, when the inner processing is executed by the application of the processing method to process a work piece by sublimation with the convergent beams of a predetermined energy density or more in the inner side of the transparent work piece by use of the light wavelength of the aforesaid laser beams (light), there is a need for the provision of the discharge port through which the material of the work piece that has been sublimated and vaporized is discharged to the outside. In this case, the provision of the discharge port is necessary in order to prevent a work piece from being broken or caused to crack due to the higher pressure of the sublimated gas inside the work piece.

Therefore, with this processing method used for processing and forming ink flow paths or the like by sublimation, for example, it becomes possible to from the ink flow paths or the like insider a work piece by providing the sublimation processing step from the region beyond the threshold value of the ablation process of the work piece after an ink jet recording head has been assembled.

Also, in accordance with this method, the sublimation processing is effectuated only by converging beams more than the energy density more than the threshold value of ablation processing of a work piece inside the transparent work piece at the light wavelength of the laser beams. However, as the energy density at the processing threshold value is extremely high, it is necessary to consider the following aspects when effectuating the process actually.

In other words, at first, a work material should be transparent against the wavelength of laser beams firstly so that the laser beams can enter inside the work material. If the material has a complete transparency (although there is no complete transparency actually), the absorption of laser beams does not occur as need for the execution of intended process. Here, it is necessary to provide a light absorptance of approximately 0.1% of the wavelength of the laser beams.

Then, secondly, the energy density of the laser beams is needed so that it may reach the one having the threshold value of the sublimation processing, even if the light absorptance is 0.1%. For example, when polysulfone resin is used as the work material, the threshold value of the ablation processing is the absorption of energy density of approximately 15 megawatts/cm$^2$. Thus, the sublimation processing takes place in the region having the energy density higher than this threshold value. As a result, when performing the actual process, the radiated energy density of the laser beams should be 15 gigawatts/cm$^2$, because polysulfone presents approximately 0.1% light absorptance when it is transparent and colorless in the region from the visible rays to the near infrared rays at the wavelength of laser beams of 775 nm.

Now, if the inner processing of a work piece is attempted with the krypton fluorine excimer laser at the ultraviolet wavelength of 248 nm, for example, which is the laser having a higher output than the aforesaid femtosecond laser used here as described above, but in condition that no cutting reaction takes place on the molecular binding due to the photochemical reaction, the required laser radiation energy density is 15 gigawatts/cm$^2$, provided that the work material has the ultraviolet absorptance of 0.1% at the ultraviolet transmission, and the threshold value of the ablation processing of 15 megawatts/cm$^2$. Against this, the typical oscillation energy density of the krypton fluorine excimer laser for versatile use cannot obtain an output not more than approximately 20 megawatts, because the energy is 400 milijouls per pulse at the pulse radiation time of approximately 20 nanoseconds. Thus, unless the total energy is concentrated in a domain of 0.35 mm every side (0.12 mm2), it is impossible to reach the energy density of 15 gigawatts/cm$^2$. Also, in consideration of the absorption, scattering, or the like of radiated laser beams on the optical system, it is only possible to deal with the processing in a domain much smaller when the method is actually applied.

In contrast to this, the aforesaid femtosecond laser has actually the one which can oscillate in ultrashort pulses among those available on the market in recent years, for example. Some of them provides the pulse radiation time of 150 femtoseconds or less at the laser bear wavelength of 775 nm, having the light energy of 800 microjouls per pulse. By use of this laser, the energy density of radiated laser beams reaches a level of approximately 5.3 gigawatts in terms of oscillation pulse. In other words, it is required to obtain the energy density of 15 gigawatts/cm$^2$ in order to execute the inner processing of polysulfone, but with this laser, a simultaneous processing becomes possible in a region of 6 mm every side (36 mm$^2$) at the maximum.

Figure 13:
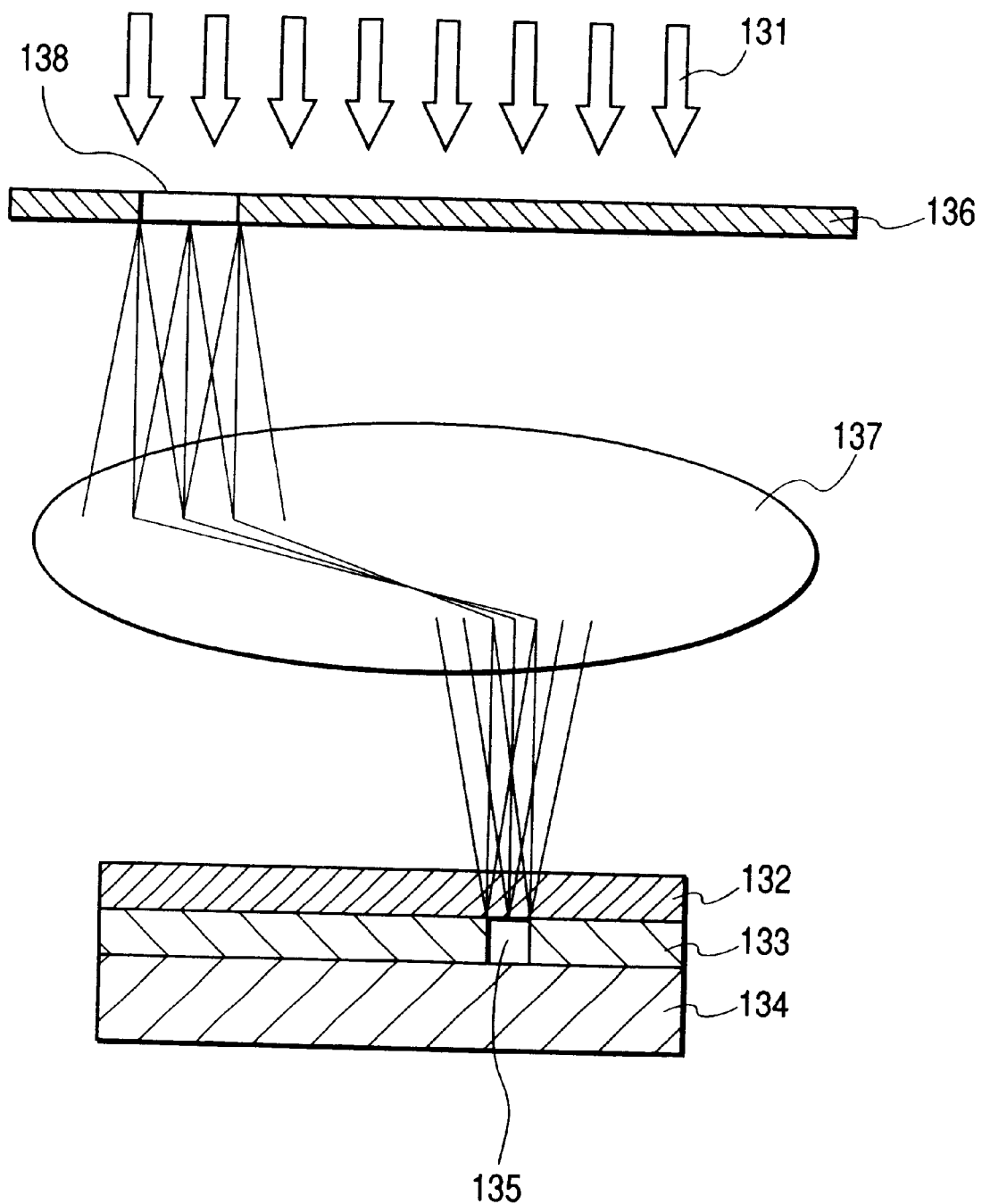
FIG. 13 is a view which illustrates a laser processing method in accordance with a seventh embodiment of the present invention.

Also, with the application of the structure described above, it becomes possible to process and form a structural member for the aforesaid material (B) by enabling the aforesaid laser beams of light wavelength as shown in FIG. 13 to pass the material (A) having low light absorptance, which is almost transparent, and to irradiate the material (B) having a higher light absorptance than the material (A) at the light wavelength of the aforesaid laser beams, which is positioned inside the work piece. However, even for this processing method, there is a need for the provision of a discharge port to discharge the work material which has been sublimated and vaporized to the outside when the inner processing is executed. Also, this processing method is the one that performs the sublimation processing on the portion of the work piece where the energy density exceeds the threshold value of the ablation processing. However, since it is necessary to make a setting so that for the material (A) that the laser beams should pass, the energy density does not exceed the threshold value of the ablation process, but for the inner material (B), it should exceed the threshold value of the ablation processing, the following should be taken into consideration for the actual processing as to the selection of the material (A) and material (B), as well as the radiation of laser beams.

Here, if the material (A) and material (B) are composed by resin material, such as polysulfone resin, the threshold value of ablation processing is the absorption of the energy density at approximately 15 megawatts/cm$^2$. Then, if the wavelength of the laser beams to be used is 775 nm, the material (A) (polysulfone resin) allows the laser beans to pass it through without any processing, provided that the laser radiation energy density is set at 15 gigawatts or less with the light absorptance of polysulfone resin being approximately 0.1%.

Then, if the blue color polysulfone is used for the material (B), which is prepared by mixing blue dye in polysulfone by dispersion so that light absorption of black color is made at the wavelength of laser beams of 775 nm, it becomes possible to raise the light absorptance of the light wavelength of 775 nm up to approximately 70%. In other words, the ablation processing threshold value becomes 15 megawatts/cm$^2$ divided by 0.7 equals to 21 megawatts/cm$^2$ for the blue polysulfone resin. Then, if the laser beams are radiated with the energy density of 0.021 gigawatts/cm$^2$ or more, the material (B) can be processed. As a result, if the laser beams are radiated with the energy density of 0.1 to 1.0 gigawatt/cm$^2$, only the material (B) which is arranged inside the material (A) can be processed.

Also, with the structure which allows a work piece to be mixed with dye for coloring so as to absorb the wavelength region equivalent to the oscillating wavelength of the aforesaid laser beams, it becomes possible to attempt the enhancement of the processing efficiency.

EMBODIMENTS

Hereinafter, the embodiments of the present invention will be described. However, it is to be understood that the present invention is not necessarily limited only to the embodiments given below.

First Embodiment

FIGS. 1A to 1E are views which schematically illustrate a method for processing ink discharge ports of an ink jet recording head in accordance with a first embodiment of the present invention. In FIGS. 1A to 1E, the progressive states of process in this method are schematically shown as the time elapses.

Figure 1B:
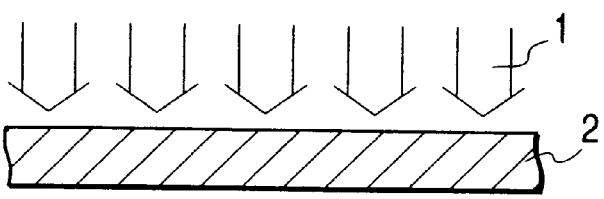

In FIG. 1A, a reference numeral 2 designates a resin plate which is the basic material used for the formation of ink discharge ports. Then, as shown in FIG. 1B, the laser beams 1 that irradiate light are radiated on the resin plate 2 in a configuration of plural discharge ports through the mask having a plurality of opening patters formed at predetermined intervals so that the arrangement density of the discharge ports become 900 dpi. Here, in accordance with the present embodiment, the femtosecond laser is used on the following condition: the irradiating laser beams are near infrared rays having the wavelength of 775 nm; the width of radiation pulse time is 150 femtoseconds per pulse; the light energy of the laser radiation is 15 µJ per pulse; and the radiation energy density (fluence) is approximately 1 J/cm$^2$ per pulse.

Figure 1C:
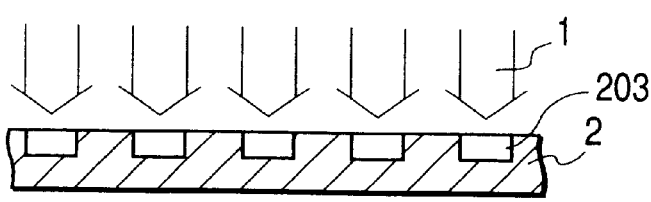

In the stage shown in FIG. 1C, each portion at 203 where beams are radiated is ablatively processed and gradually etched.

Figure 1D:
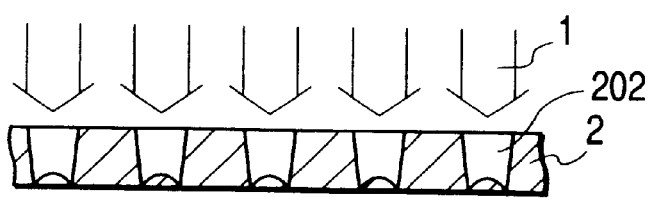

In the stage shown in FIG. 1D, the etching further advances, and each portion of the resin plate 2 at 202 is immediately before complete penetration only with a thin skin being left intact.

Figure 1E:

In FIG. 1E, the penetration process is completed for the resin plate 2 by use of the predetermined pattern, and the radiation of laser beams is suspended, thus completing the formation of each of ink discharge ports 201.

With respect to the processing steps described above, attention should be given to the aspect that each process advances following the radiation of beams exactly.

Now, in comparison with the conventional example shown in FIGS. 2A to 2E, the detailed description will be made of the characteristics of the present embodiment in particular.

FIGS. 2A to 2E are views which schematically illustrate a method for processing ink discharge ports of an ink jet recording head in accordance with the conventional method. In FIGS. 2A to 2E, the progressive states of the conventional process are schematically shown as the time elapses.

Figure 2A:
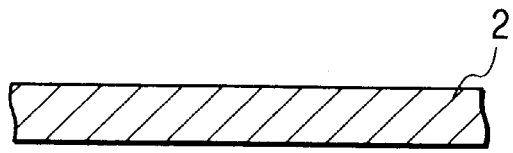
FIGS. 2A, 2B, 2C, 2D and 2E are views which schematically illustrate the method for processing ink discharge ports of an ink jet recording head in accordance with the conventional example to be compared with the first embodiment.
Figure 2B:
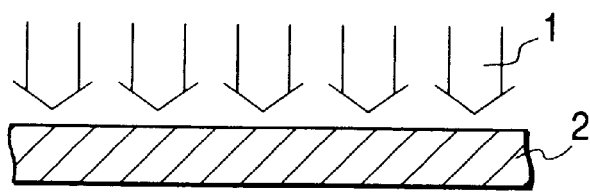

In FIG. 2A, a reference numeral 2 designates a resin plate which is the basic material used for the formation of ink discharge ports. Then, as shown in FIG. 2B, the laser beams 1 that irradiate light are radiated on the resin plate 2 in the form of the predetermined pattern in the same manner as shown in the aforesaid embodiment. Here, the far ultraviolet rays having the wavelength of 248 nm are used as the irradiating laser beams; the width of radiation pulse time is 15 nanoseconds per pulse; the light energy of the laser radiation is 500 mJ per pulse; and the radiation energy density (fluence) is approximately 1 J/cm$^2$ per pulse.

Figure 2C:
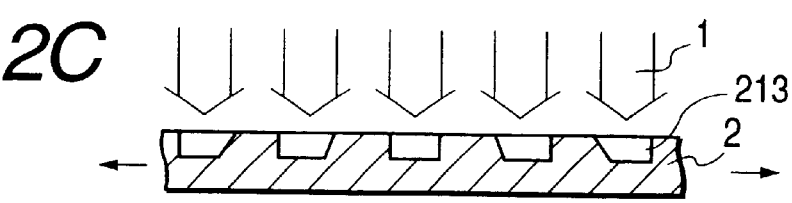

In the stage shown in FIG. 2C, each portion at 213 where beams are irradiate is ablatively processed and gradually etched. However, since the temporal width of oscillation pulse of the irradiating layer beams is as long as 15 nanoseconds, the light energy absorbed into the resin plate 2 is partly converted into thermal energy, which is caused to spread in the entire body of the resin plate at given conduction rate eventually, thus allowing the resin plate 2 to expand in the directions indicated by arrows in FIG. 2C.

Figure 2D:
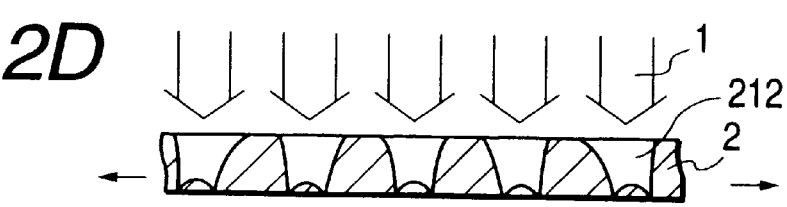

Then, in the stage shown in FIG. 2D, the etching process further advances, but during this period, the expansion of the resin plate 2 gradually advances in the direction indicated by arrows in FIG. 2D.

In this stage shown in FIG. 2D, the etching further advances, and the resin plate 2 is in a state immediately before complete penetration only with a thin skin being left intact as at 212. In this stage, the thermal expansion of the resin plate further advances. As readily understandably from FIG. 2D, the nozzles located more on the outer side from the center are directed more outward in the processed state of ink discharge ports 212.

Also, the amount of accumulated heat of the resin plate increases as the etching process advances. As a result, resin is fused in each vicinity of the portions where laser beams are irradiate to give curvature to each edge of etching inevitably.

Figure 2E:

In FIG. 2E, the penetration process is completed for the resin plate 2 by use of the predetermined pattern, and the radiation of laser beams is suspended, thus completing the formation of each of ink discharge ports 211.

As described above, by use of the conventional laser processing, the nozzles are directed outward when ink discharge ports are processed, for example. Also, curvature is given to each edge inevitably. The ink discharge ports thus formed make it difficult to discharge ink droplets straightly in parallel.

In contrast, if photoetching process is performed by the method embodying the present invention, it becomes possible to suppress the heat accumulation in a work piece, and form the ink discharge ports arranged in parallel in high density, hence manufacturing an ink jet recording head capable of discharging ink droplets straightly in parallel.

Further, with the observation of laser processed surface and surface shape obtainable by the present embodiment, it has been confirmed that as compared with the processed surface of the conventional example, the present embodiment presents extremely smooth surface, and that there are almost no flushes observable on the surface.

This condition contributes to the reduction of factors that may bring about the flow disturbance of unwanted ink on the ink flow passage portion of an ink jet recording head or the disturbance of discharge direction, which should be preferable for performing high quality ink discharges.

Also, it is unnecessary to apply ultraviolet rays as the wavelength o the laser beams radiated here during the pulse radiation time of one picosecond or less. It may be possible to use visible rays or infrared rays without any problem as far as a work piece can absorb the light of such wavelength radiated from either of them. By the application of one from the visible rays to near infrared rays having the wavelength of laser beams of 350 to 1,000 nm in particular, it becomes easier to secure the laser power. Also, a material for general use can be utilized for lenses and components required for the formation of an optical system with lesser possibility of damages given to the optical system, and at the same time, as compared with the use of the conventional ultraviolet laser, the running costs are reduced significantly.

Also, for the present embodiment, the processing material is not necessarily limited to resin. For example, it is possible to process ceramic material, metallic material, or the like. Here, by the radiation of the conventional ultraviolet laser beams, it is difficult to process metals, such as SUS, opaque ceramics, or Si.

Then, even for such material as metal which has a higher heat transfer coefficient, it is possible to perform the ablation processing in an extremely high precision without conditioning the liquid phase, because the processing steps are completed before heat dispersion advances beginning with the initiation of beam radiation.

Moreover, even for such materials as quartz, optical crystal, or glass material which has a higher light transmitting efficiency (transmittancy) with a slight beam absorptance, the ablation processing is executable, because the capability of the temporal energy density is high.

In other words, the processing material, which is used in general for a structural member of ink discharge ports, ink flow paths, an ink liquid chamber, or an ink supply port of an ink jet recording head, is polyimide, polysulfone, or some other resin material. However, the material is no longer limited thereto, but inorganic material, glass material, metallic material, or semiconductor material is now ablatively processed by the application of laser. As a result, more freedom is now given to the selection of materials for a structural member of ink discharge ports, ink flow paths, an ink liquid chamber, or an ink supply port.

Therefore, whereas the anisotropic etching is often used conventionally for the formation of ink flow paths, liquid chamber, ink supply port, or the like on the Si base plate, the present invention makes it possible to process the Si base plate in a desired configuration without any restrictions imposed upon the processed shape when the anisotropic etching is used.

Also, if ceramic material or glass material is used for the aforesaid work piece, it becomes possible to manufacture an ink jet recording head having an excellent durability and storage capability, which is not easily eroded even by strong alkaline ink.

Then, if the ceramic material or the like which has a high fusion point is used for the discharge port plate, it becomes possible to give high temperature treatment, such as water-repellent process, to the surface of the ink discharge ports.

Moreover, if semiconductor material is made usable, it becomes possible to form such structures as described above directly on the integrated circuit.

Also, since the material having a smaller linear expansion coefficient can be used, it becomes possible to prevent the bonded faces of each member from being deviated due to the shearing force.

Figure 3:
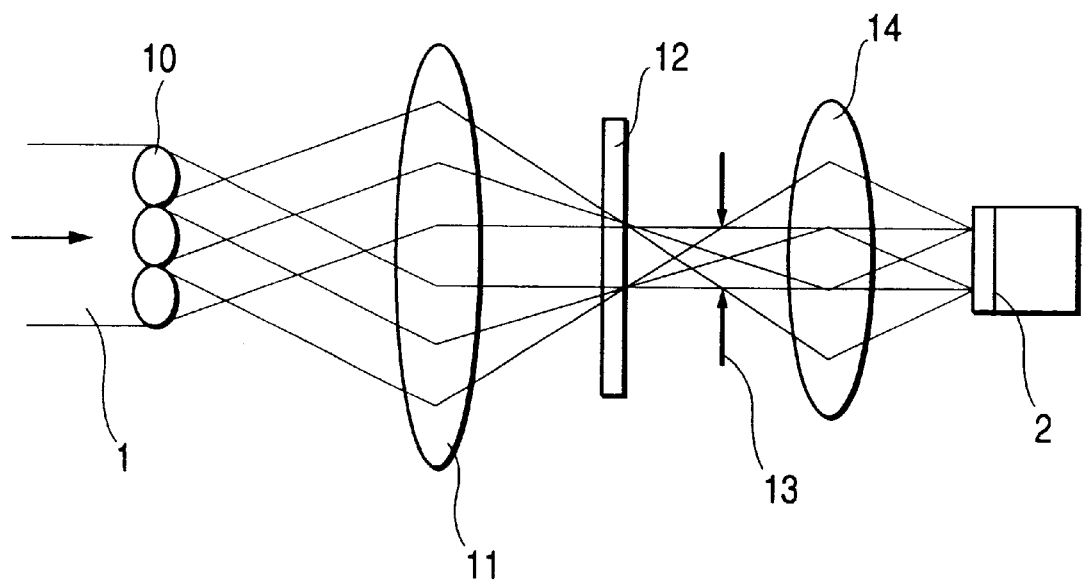
FIG. 3 is a view which schematically shows the optical system of a laser processing apparatus in accordance with a first embodiment of the present invention.

FIG. 3 is a view which schematically shows the optical system of a laser processing apparatus in accordance with the first embodiment of the present invention.

The beam flux 1 oscillated from the laser main body (not shown) is induced into the fly eyes or some other optical integrator 10 to decompose the incident laser beam flux into plural numbers, and the decomposed beam fluxes are superposed by use of the field lens 11 on the mask 12 having a plurality of opening patterns formed at predetermined pitches, thus correcting the illuminating intensity of laser substantially equal for illuminating the mask.

Also, the field lens 11 projects the dot images converged on plural points by use of the fly eye lenses 10 on the positions of aperture 13 of the mask pattern projection lens 14, thus forming the Koehler illumination system.

For an optical system of the kind, the laser beams are illuminated on the mask 12. Then, the mask pattern formed on the mask 12 is projected onto the surface of a work piece, such as an orifice plate 2, by use of the projection focusing lens 14. In this way, the orifice plate 2 is processed by means of the laser oscillation.

Second Embodiment

FIGS. 4A to 4D and FIGS. 5E to 5G are views which illustrate the steps of processing a cantilever to be manufactured by laser processing in accordance with a second embodiment of the present invention.

Now, the description will be made of the method for manufacturing an electrostatic type cantilever in accordance with FIGS. 4A to 4D and FIGS. 5E to 5G.

Figure 4A:
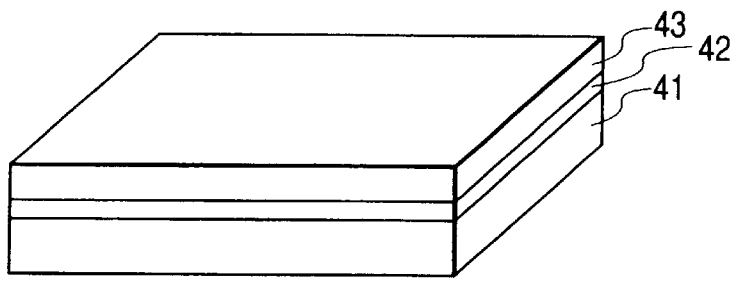
FIGS. 4A, 4B, 4C and 4D are views which illustrate the steps of processing a cantilever to be manufactured by laser processing in accordance with a second embodiment of the present invention.

In FIG. 4A, a basic member is prepared in such a manner that an aluminum thin film 42 is formed on a silicon base plate 41 by use of vapor deposition or sputtering. Then, a resin film 43 (actually, a resist film) is coated on it by means of spin coating.

Figure 4B:
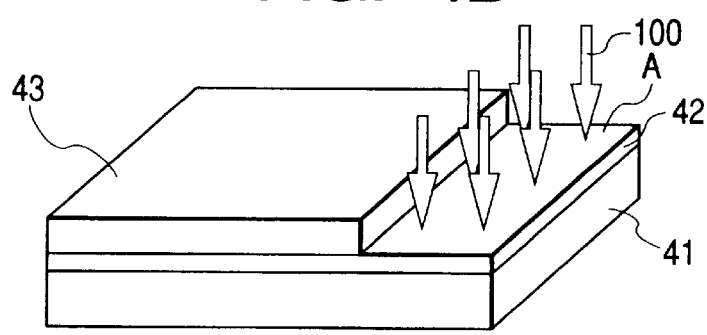
Figure 4C:
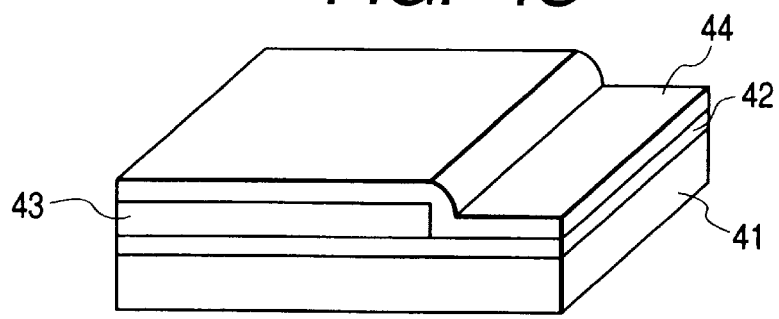

Then, in the step shown in FIG. 4B, the resin film 43 is locally removed by the radiation of patterning laser to form the electron contact surface A. Then in the step shown in FIG. 4C, a metallic film 44 (an elastic metal film such as aluminum or copper) is formed by means of vapor deposition.

Figure 4D:
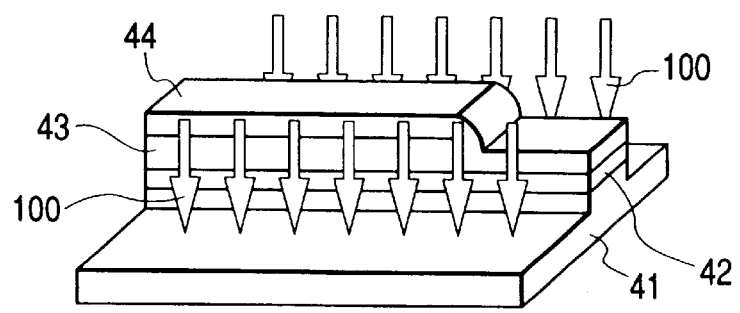

Then, as shown FIG. 4D, with the radiation of ultrashort pulse laser having a predetermined pattern, the metallic film 44, resin film 43, aluminum film 42 and silicon base plate 41 are locally removed by the sublimating ablation at a time. In this case, the laser in use is near infrared having the wavelength of 775 nm; the temporal width of radiated pulse is 150 femtoseconds per pulse; the light energy of laser radiation is 800 microjouls per pulse; the radiated energy density (fluence) is approximately 50 jouls/$cm^2$; and the pulse energy density is approximately 300 terawatts/$cm^2$.

Figure 5E:
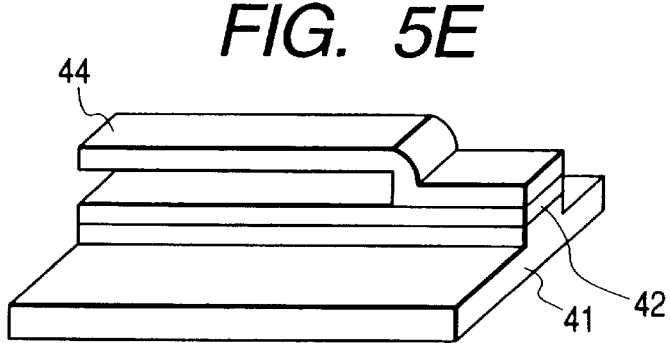
FIGS. 5E, 5F and 5G are views which illustrate the steps of processing the cantilever shown in FIGS. 4A, 4B, 4C and 4D in accordance with the second embodiment of the present invention.
Figure 5F:
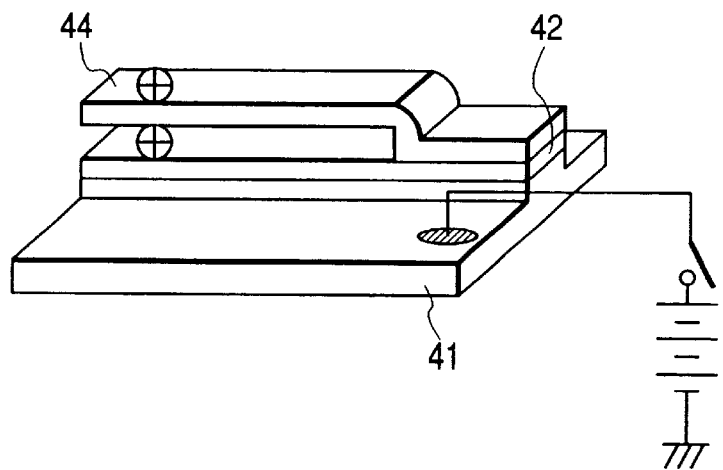
Figure 5G:
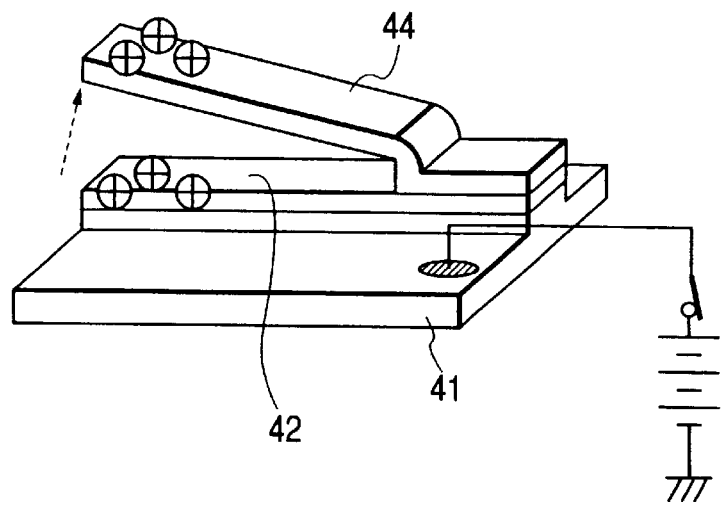

Then, in the step shown in FIG. 5E, the resin layer 43 is fused and removed to complete the structure of a cantilever. After that, in FIG. 5F, the electric charges are accumulated on the leading end of the cantilever with the electric filed which is formed by drawing wire from the silicon base plate. When the electric charges are filled with the predetermined electric field, the portion of the cantilever at 44 is open and raised as shown in FIG. 5G. In other words, a microlever is produced, which is open or closed by the switching of electric fields.

The aspect that should be given attention for the processing steps herein is that different kinds of material are processed in one and the same step as shown in FIG. 4D. In the case of manufacture by means of the conventional lithographic process, each individual different material should be given a series of processes, such as etching, resist ashing, which utilize the resist coating, resist patterning exposure, resist development, and resist patterning for the formation a structural member. With the present embodiment, it is possible to carry out the required processing in an extremely simple step.

Third Embodiment

Figure 6A:
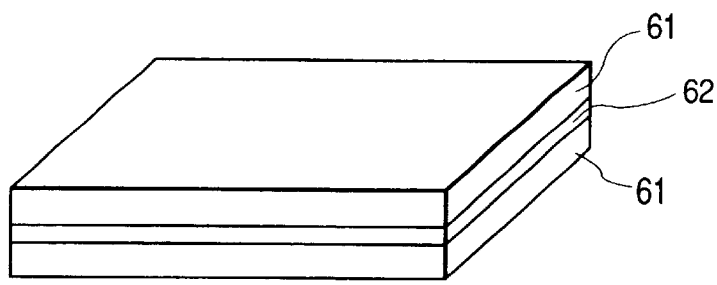
FIGS. 6A, 6B and 6C are views which illustrate the steps of processing the ink discharge ports to be manufactured by laser processing in accordance with a third embodiment of the present invention.
Figure 6B:
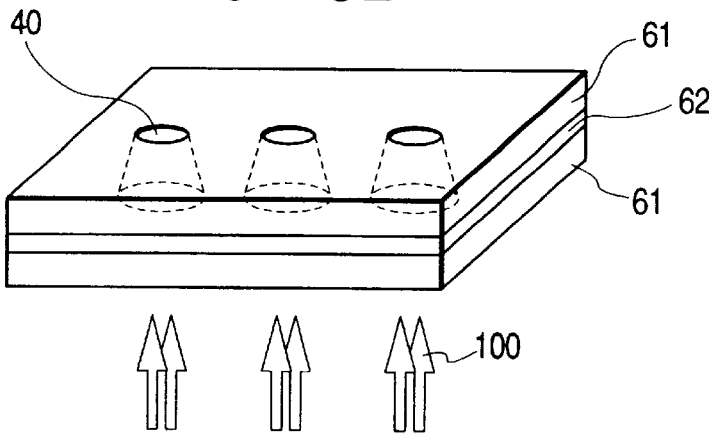
Figure 6C:
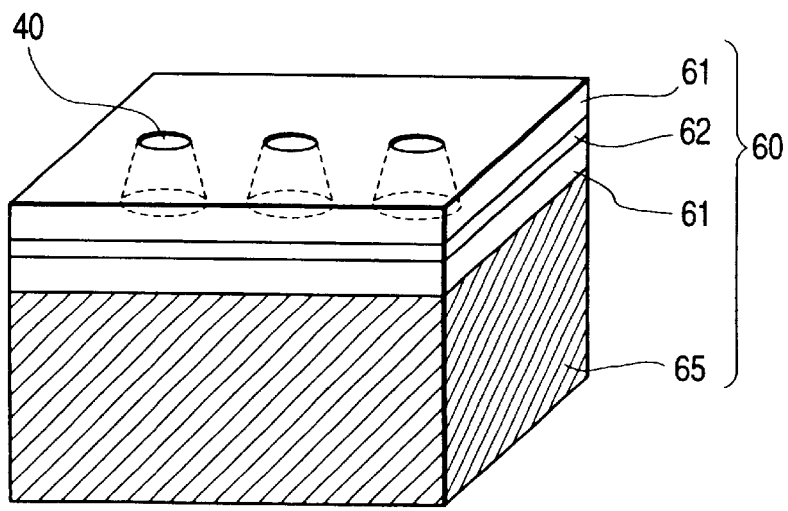

FIGS. 6A to 6C are views which illustrate the steps of processing the ink discharge ports to be manufactured by laser processing in accordance with a third embodiment of the present invention.

Now, the description will be made of the method for processing to form ink discharge ports 40 on the orifice plate 60 of an ink jet recording head in accordance with FIGS. 6A to 6C.

In FIG. 6A, an orifice plate member is prepared by inserting a thin copper foil 62 into the polysulfone sheet 61.

With the insertion of the copper foil 62 into the polysulfone sheet 61, the following can be achieve, among some others:

(1) The thermal expansion of the polysulfone sheet is made as close as possible to that of the silicon IC base plate 80 where the silicon ceiling plate 70 constituting the ink flow paths, ink liquid chamber, and the like of the ink jet main body, and ink discharge pressure generating elements 81 are incorporated, thus making it possible to prevent a drawback from taking place on the bonding of the orifice plate 60 due to heat up of the ink jet recording head or the heating that may occur during the distribution thereof for delivery.

(2) The copper foil may function to radiate heat in order to prevent any deformation due to the temperature rise that may occur locally on the orifice plate 60.

Then, as shown in FIG. 6B, the polysulfone layer 61 and the copper foil layer 62 are processed by sublimating ablution at a time to form the ink discharge ports 40 by irradiating the ultrashort pulse laser having the predetermined pattern by use of the mask projection optical system or the like. The laser used in this case is the same as the one used for the second embodiment, which is the near infrared rays having the wavelength of 775 nm; the temporal width of radiated pulse is 150 femtoseconds per pulse; the light energy of laser radiation is 800 microjouls per pulse; the radiated energy density (fluence) is approximately 10 jouls/cm², and the pulse energy density is approximately 60 terawatts/cm². Then, in the step as shown in FIG. 6C, the orifice plate 60 having the ink discharge ports 40 formed therefor is adhesively bonded to the ink jet main body 65 after being aligned with the position of the ink flow paths 71, thus manufacturing the principal part of the ink jet recording head.

Fourth Embodiment

Figure 7A:
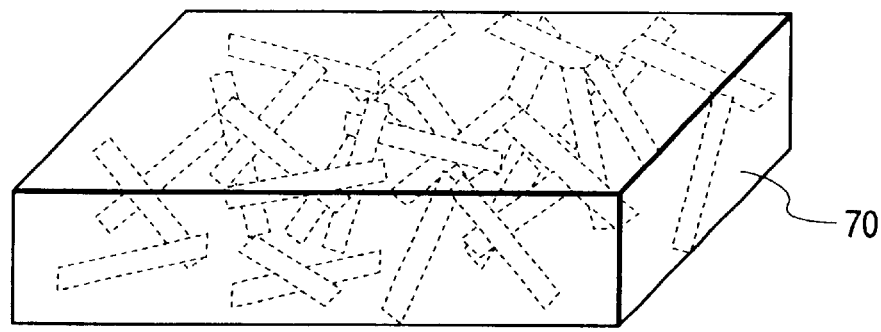
FIGS. 7A, 7B and 7C are views which illustrate the steps of processing the ink flow paths and an ink liquid chamber to be manufactured by laser processing in accordance with a fourth embodiment of the present invention.
Figure 7B:
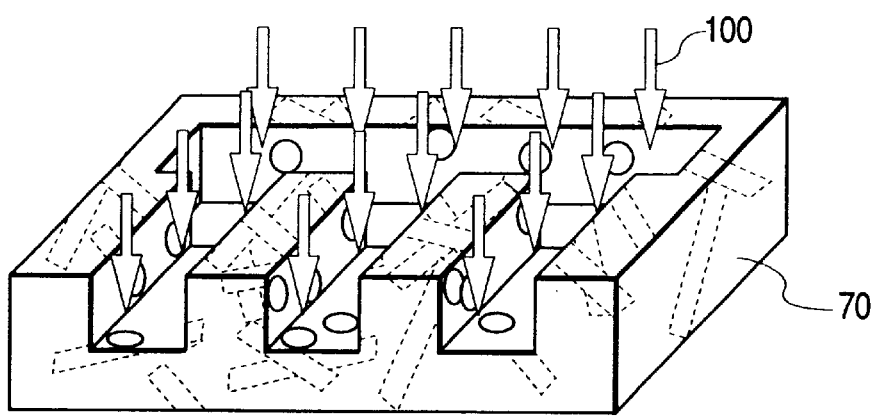
Figure 7C:
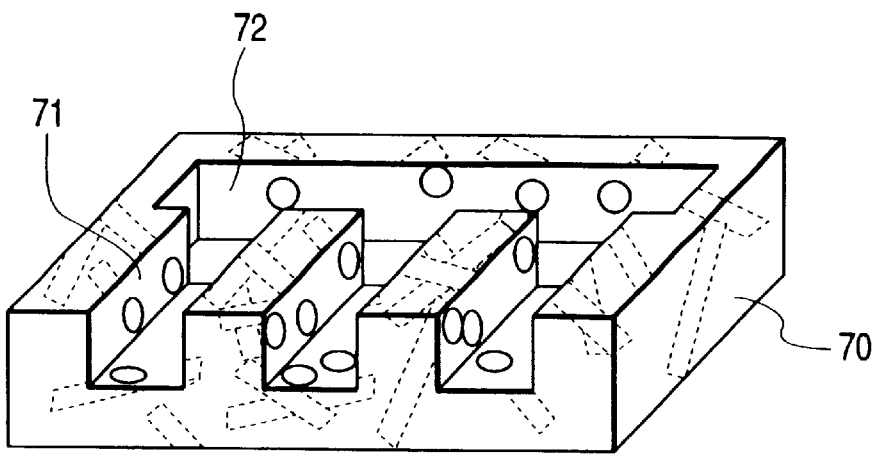

FIGS. 7A to 7C are views which illustrate the steps of processing the ink flow paths and an ink liquid chamber to be provided for the ceiling plate of an ink jet recording head in accordance with a fourth embodiment of the present invention.

Now, the description will be made of the method for processing to form the ink flow paths 71 and an ink liquid chamber 72 on the ceiling plate 70 of an ink jet recording head 70 in accordance with FIGS. 7A to 7C and FIGS. 8D to 8E.

In FIG. 7A, a plate member is shown, which is a polysulfone plate 61 with glass fillers being mixed in it in order to suppress the thermal expansion coefficient. Then, as shown in FIG. 7B, the ultrashort pulse laser is radiated with predetermined pattern by use of the mask projection optical system or the like to process it together with the glass fillers by the sublimating ablation, hence forming the ink flow paths 71 and the ink liquid chamber 72 as shown in FIG. 7C. The laser used in this case is the same as the one used for the second and third embodiments, which is the near infrared rays having the wavelength of 775 nm; the temporal width of radiated pulse is 150 femtoseconds per pulse; the light energy of laser radiation is 800 microjouls per pulse; the radiated energy density (fluence) is approximately 10 jouls/cm²; and the pulse energy density is approximately 60 terawatts/cm². Then, in the step shown in FIG. 8D, the silicon IC base plate 80 having the ink discharge pressure generating elements 81 incorporated thereon is adhesively bonded with the ink flow paths 71 and ink discharge pressure generating elements 81 after alignment therewith.

Figure 8D:
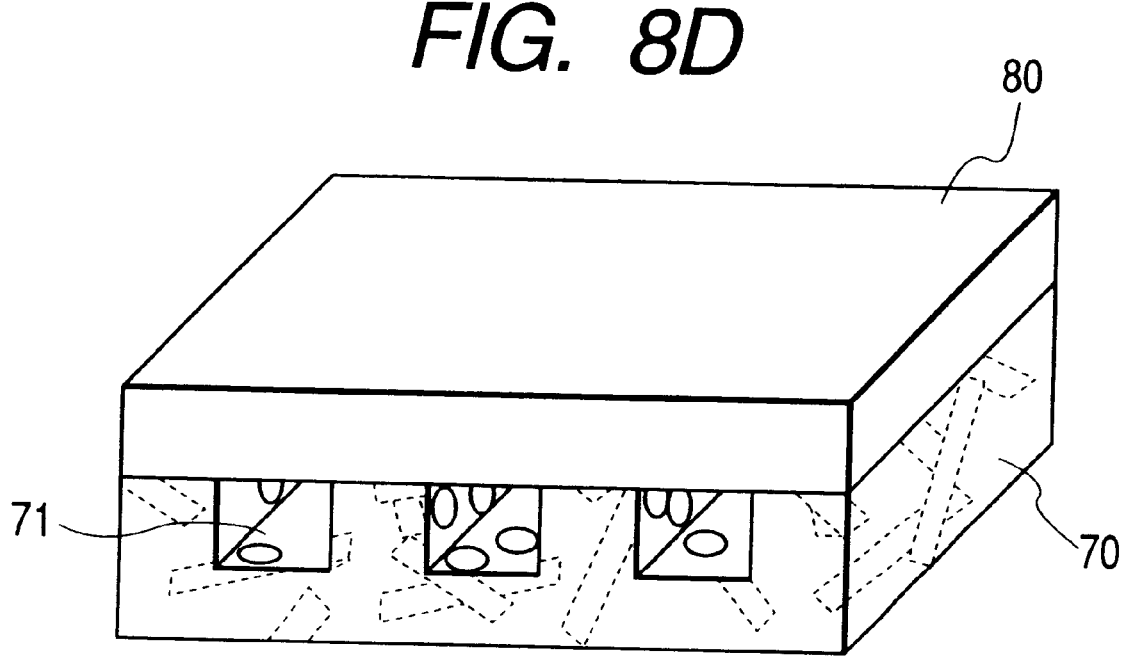
FIGS. 8D and 8E are views which illustrate the steps of processing in continuation of the processing steps shown in FIGS. 7A, 7B and 7C in accordance with the fourth embodiment of the present invention.
Figure 8E:
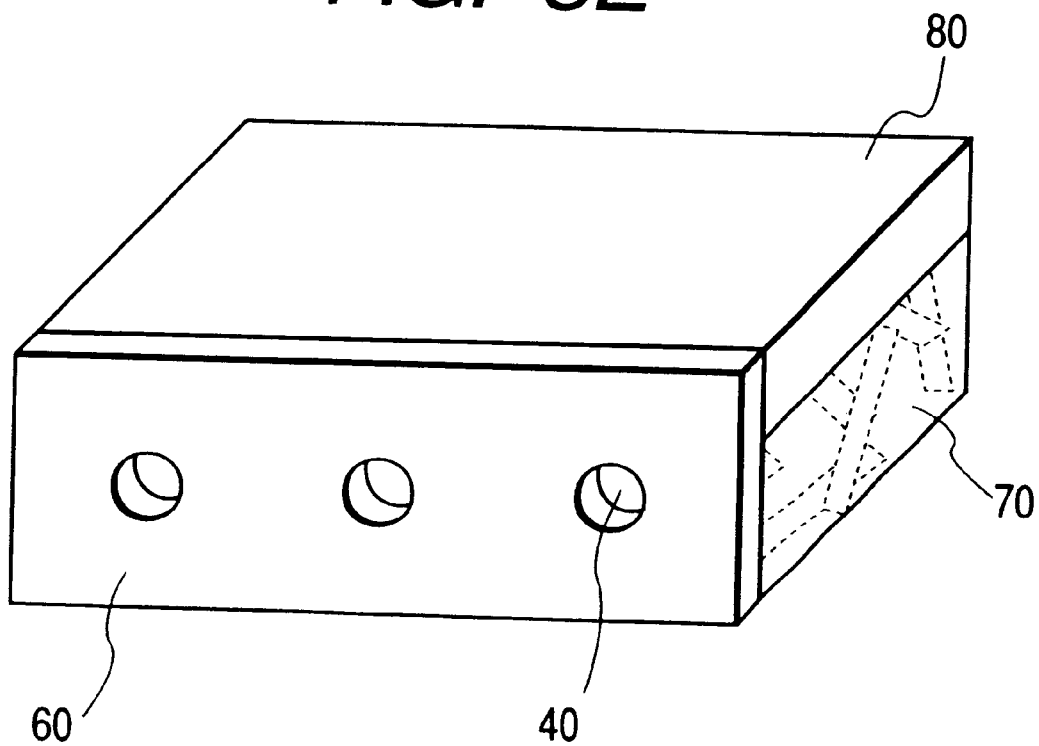

Then, in the step shown in FIG. 8E, the orifice plate 60 is adhesively bonded with the ink discharge ports 40 and ink flow paths 71 after alignment therewith to manufacture the principal part of an ink jet recording head.

Fifth Embodiment

Figure 10A:
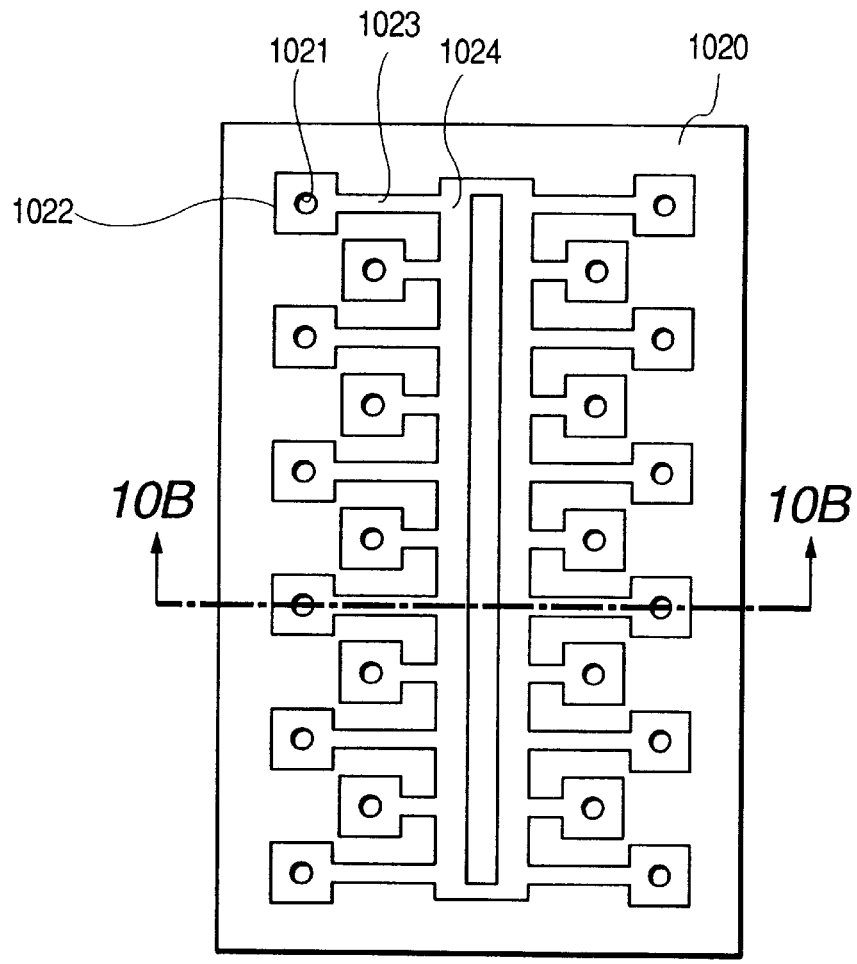
FIGS. 10A and 10B are views which illustrate the principal part of ink discharge portion for a plane discharge type ink jet recording head having the ink flow paths processed and formed by the laser processing method in accordance with the fifth embodiment of the present invention.
Figure 10B:
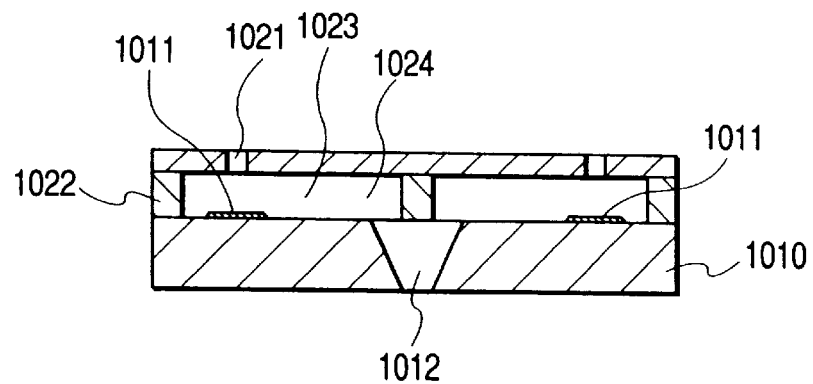

FIGS. 10A and 10B are views which illustrate the principal part of ink discharge portion for a plane discharge type ink jet recording head in accordance with a fifth embodiment of the present invention.

Now, the description will be made of the present embodiment in accordance with FIGS. 10A and 10B.

Figure 9:
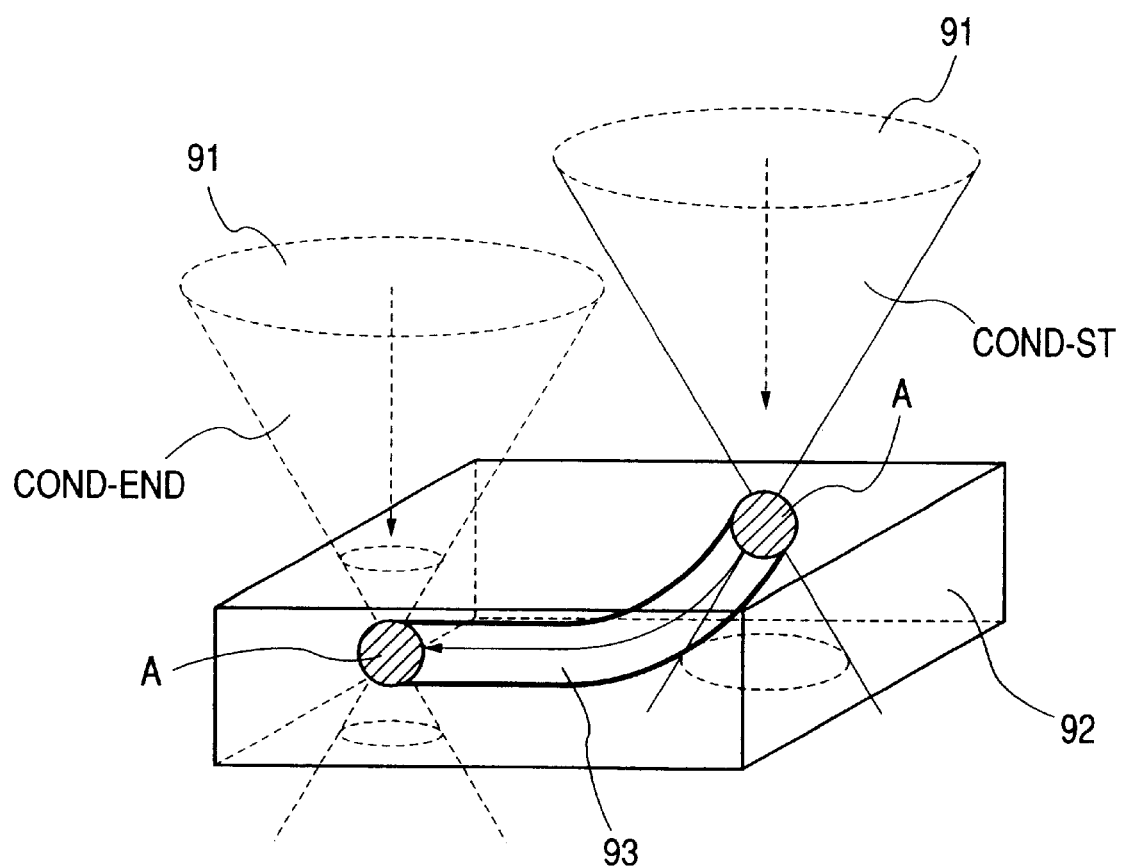
FIG. 9 is a view which illustrates a method of laser inner processing in accordance with a fifth embodiment of the present invention.

FIG. 10A is a view which shows the ink discharge surface of the ink discharge principal portion of a plane discharge type ink jet recording head. FIG. 10B is a cross-sectional view taken on the position 10B—10B in FIG. 10A. For the present embodiment, the ink liquid chamber 1024, the ink flow paths 1023, the ink buffer chamber 1022, and the ink discharge ports 1021 are processed and formed using a method represented in FIG. 9 on a silicon IC base plate 1010 having ink discharge generating elements 1011 installed thereon in a state where a resin plate 1020, which is transparent in the range from visible rays to near infrared rays, is adhesively bonded therewith. Here, the ultrashort pulse laser beams (one picosecond or less) having the wavelength of 7.75 nm is convergently radiated onto the predetermined position inside the resin plate 1020 for the formation of these members described above.

The details of the laser used here is: near infrared rays having the wavelength of 7.75 nm; the temporal width of radiated pulse is 150 femtoseconds per pulse; the light energy of laser radiation is set so that the energy density becomes approximately 20 gigawatts/cm² in a range of φ10 μm by converging the laser beams which have been reduced to 5.0 nanojouls per pulse.

After the resin plate 1020 is bonded onto the silicon IC base plate 1010 having the ink discharge pressure generating elements 1011 installed thereon, the ink liquid chamber 1024, the ink flow paths 1023, the ink buffer chamber 1022, and the ink discharge ports 1021 are process and formed. In this case, the laser processing is possible with the ink discharge pressure generating elements 1011 and the patterns of the silicon IC base plate 1010 as the criteria for that processing. Therefore, unlike the case where the silicon base plate 1010 is aligned and bonded after the ink liquid chamber 1024, the ink flow paths 1023, the ink buffer chamber 1022, and the ink discharge ports 1021 have been processed and formed for the resin plate 1020, the bonding alignment errors may be eliminated so that the ink liquid chamber 1024, the ink flow paths 1023, the ink buffer chamber 1022, and ink discharge ports 1021 can be incorporated in higher precision.

Sixth Embodiment

Figure 11A:
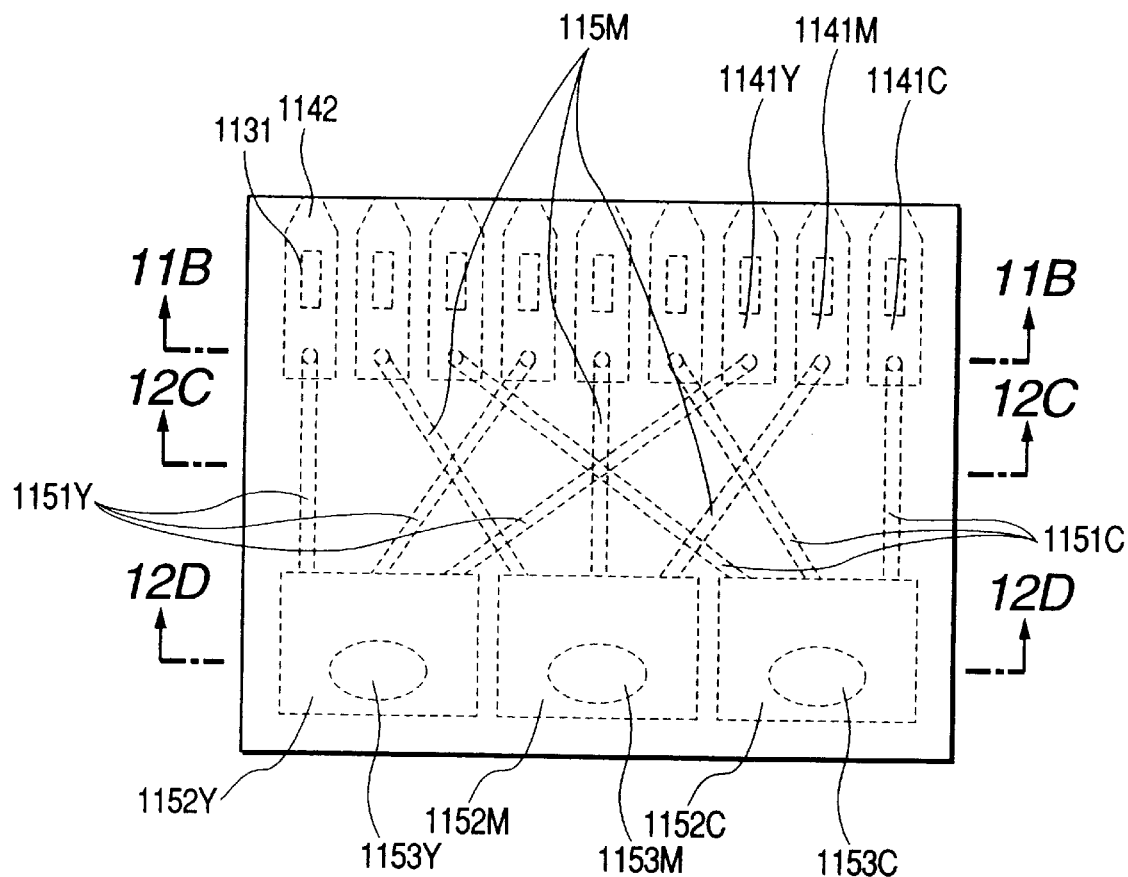
FIGS. 11A and 11B are views which illustrate the principal part of ink discharge portion for a YMC color circulating nozzle type ink jet recording head having the ink flow paths processed and formed by the laser processing method in accordance with a sixth embodiment of the present invention.
Figure 11B:
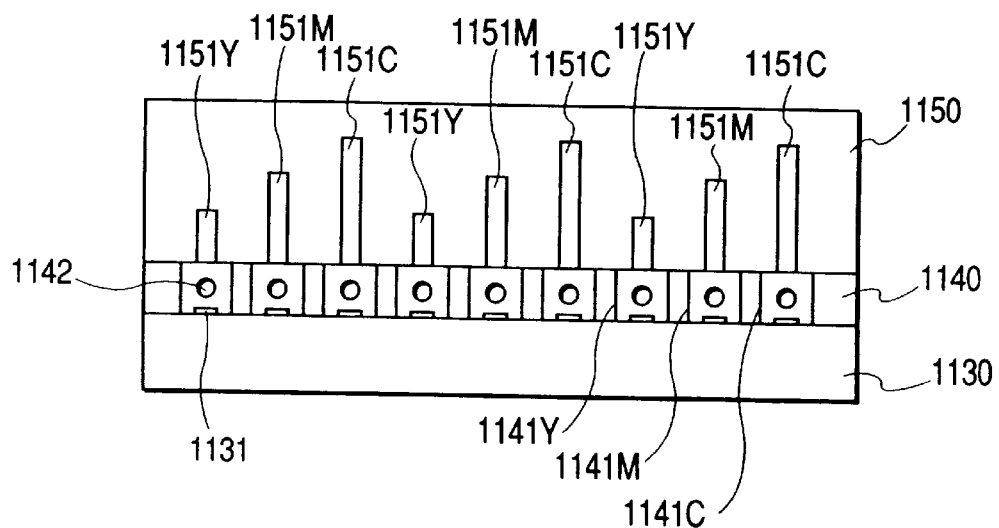

FIGS. 11A and 11B are views which illustrate the principal part of ink discharge portion for an edge face discharge type ink jet recording head having the ink flow paths processed and formed by the laser processing method in accordance with a sixth embodiment of the present invention.

Now, the description will be made of the manufacture of the YMC color circulating nozzle type ink jet recording head of the present invention in accordance with FIGS. 11A and 11B, and FIGS. 12C and 12D.

Figure 12C:
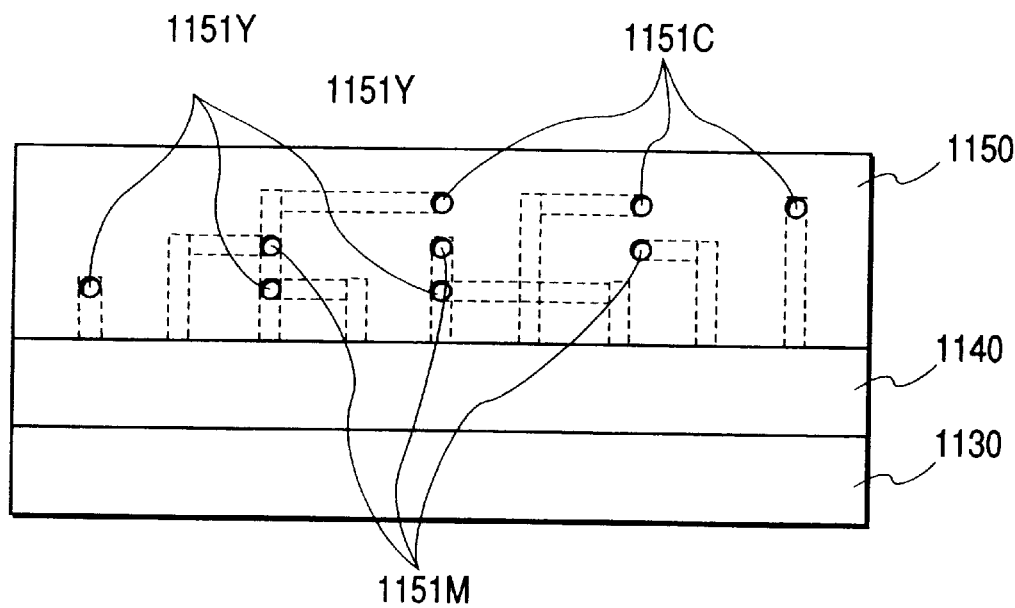
FIGS. 12C and 12D are the sectional views indicated by arrows, taken on the positions 12C—12C and 12D—12D in FIG. 11A, respectively.
Figure 12D:
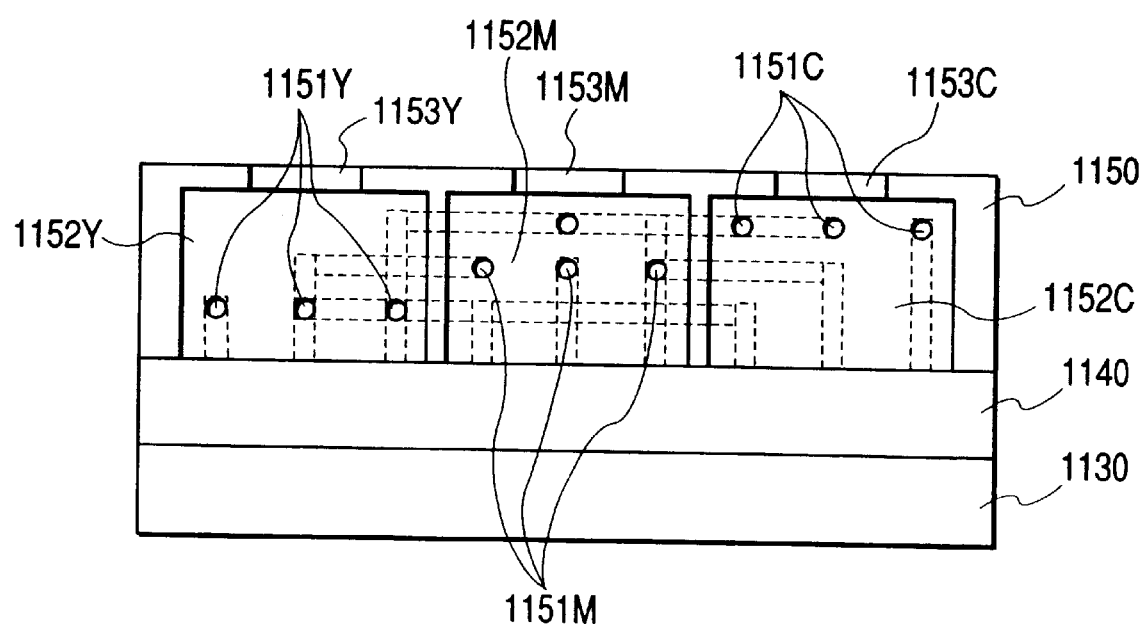

FIG. 11A is a plan view of an edge face discharge type ink jet recording head; FIG. 11B is a sectional view which is indicated by arrows, taken on the position 11B—11B. FIGS. 12C and 12D are the sectional views indicated by arrows, taken on the positions 12C—12C and 12D—12D in FIG. 11A, respectively.

As shown in FIGS. 11A to 12D, respectively, the resin plate 1140 having the ink nozzle buffer chamber 1141 and the ink discharge ports 1142 incorporated thereon is bonded and formed on the silicon IC base plate 1130 having ink discharge pressure generating elements 1131 installed thereon. Then, further on it, the resin plate 1150 is bonded, which is transparent in the range from visible rays to near infrared rays, having thereon the ink liquid chamber 1152 and the ink supply port 1153 incorporated by molding formation or the like. Then, inside this resin plate 1150, the ink flow paths 1151 are processed and formed by use of the method represented in FIG. 9 with the convergent radiation of the laser beams of ultrashort pulse (one picosecond or less) having the wavelength of 7.75 nm on the predetermined positions inside the resin plate 1150. Also, as an assembling method, it may be possible to adopt a technique whereby to bond the resin plate 1150 on the resin plate 1020 after alignment subsequent to the ink flow paths 1151 having been processed and formed inside the resin plate 1150 in advance.

The details of the laser used here is: near infrared rays having the wavelength of 7.75 nm; the temporal width of radiated pulse is 150 femtoseconds per pulse; the light energy of laser radiation is set so that the energy density becomes approximately 15 gigawatts/cm$^2$ in a range of φ10 μm by converging the laser beams which have been reduced to 3.5 nanojouls per pulse. With this setting, the inner process is executed.

For this ink jet recording head, the ink flow paths 1151 can be drawn around three-dimensionally inside the resin plate 1150. Therefore, in accordance with the present embodiment, the structure is arranged so that ink of three colors, YMC (Yellow, Magenta, and Cyan), are supplied from each of the ink supply ports 1153Y, 1153M, and 1153C, respectively, and then, the ink flow paths of the corresponding colors 1151Y, 1151M, and 1151C are piped through the ink liquid chambers of the corresponding colors 1152Y, 1152M, and 1152C for guiding ink to the ink nozzle buffer 1141 to enable ink of YMC colors to be circulated in that order. Thus, it is made possible to discharge ink with the circulating arrangement of the ink nozzle buffers 1141Y, 1141M, and 1141C.

With such arrangement as to draw around the ink flow paths 1151 inside the resin plate three-dimensionally, the discharge nozzles, which are arranged one-dimensionally to circulate ink of YMC colors from the YMC three-color ink liquid chambers, are connected per color, thus making it possible to form an ink jet recording head having discharge cells arranged for adjacent three colors, respectively. When recording is performed by this ink jet recording head, there is no need for making resist adjustments between the respective colors. No color deviations nor color phase changes occur to make it unnecessary to provide a complicated function to correct color resist or to make color resist adjustment between respective colors. Then, images can be printed with stabilized color reproduction.

In this respect, it is of course possible to manufacture an ink jet recording head having discharge cells arranged for adjacent four colors of YMCK (Yellow, Magenta, Cyan, and Black), not necessarily for adjacent three colors of YMC described above, by connecting the discharge nozzles arranged one-dimensionally to circulate YMCK colors from the corresponding ink liquid chambers containing four colors, YMCK, respectively.

Seventh Embodiment

FIG. 13 is a view which illustrates the outline of a processing method in accordance with a seventh embodiment of the present invention. In FIG. 13, a mask 136 is illuminated by the laser beams 131 which are radiated from a laser oscillator (not shown) which radiates the laser beams in the ultrashort pulse radiation time (one picosecond or less). Then, the laser beams that have passed the mask pattern 138 are projected to be focused through a projection lens 137.

The focusing image is focused on the surface of a material (B) 133 positioned in back of a material (A) 132. On the other hand, The material (A) 132 and material (B) 133 are held by a base plate 134 as a work piece. With this setting, the laser beams 131 are carried in the patter of the mask patter 138 to pass the material (A) 132 which is transparent with the light absorptance of approximately 0.1%, while keeping its energy almost as it is at the light wavelength of the laser beams, thus being radiated on the material (B) 133 whose light absorptance is set at 50% or more with the light wavelength of the laser beams.

The material (B) 133 that receives the laser radiation and absorbs the light energy 50% or more creates the sublimation phenomenon by the absorption of energy that exceeds the threshold value of ablation processing due to the predetermined light energy density of the laser beams. In this manner, a hole 135 is formed inside the work piece.

Figure 14A:
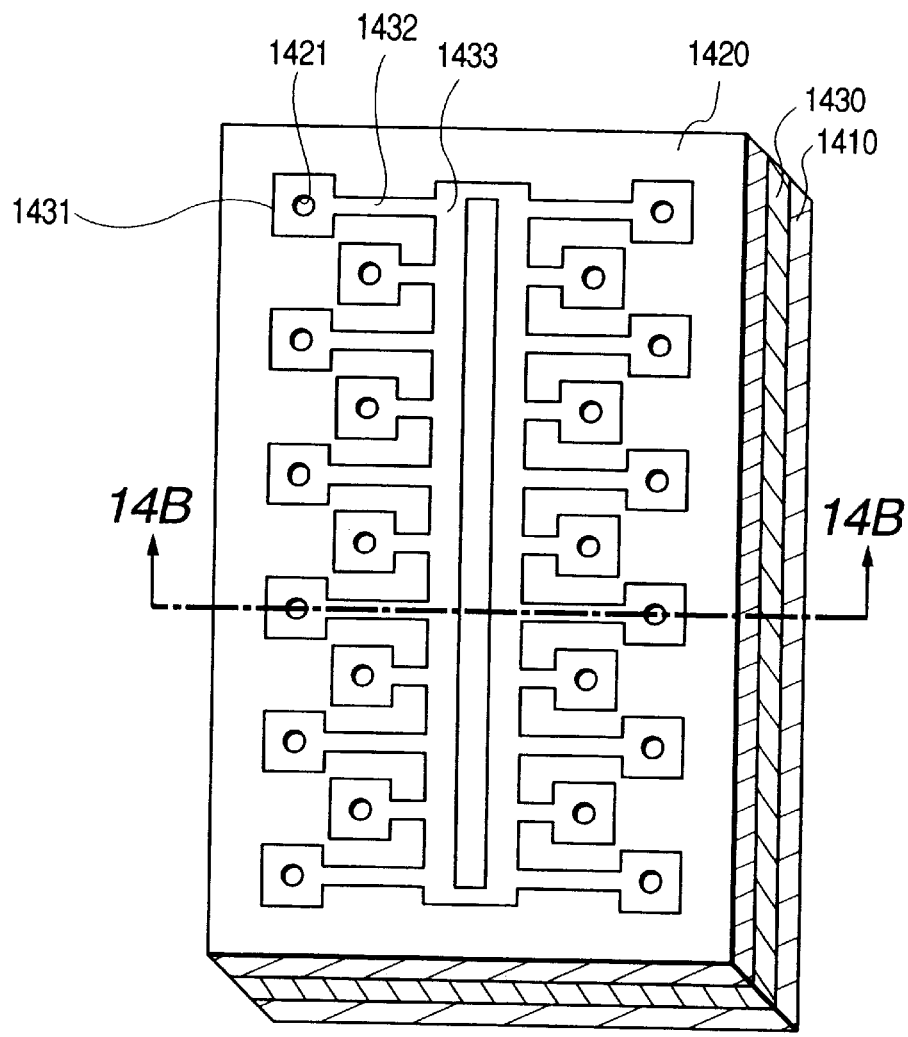
FIGS. 14A and 14B are views which illustrate the principal part of ink discharges for a plane discharge type ink jet recording head having the ink flow paths processed and formed by the laser processing method in accordance with the seventh embodiment of the present invention.
Figure 14B:
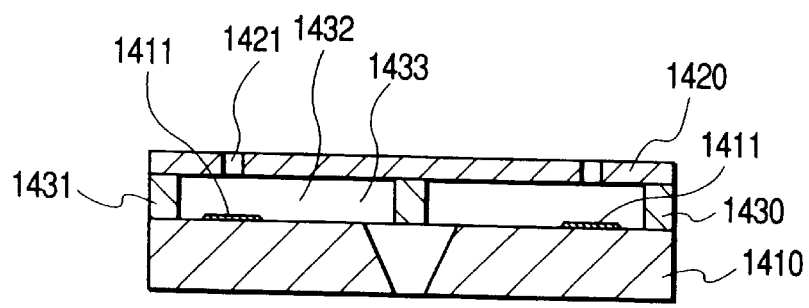

FIGS. 14A and 14B are views which illustrate the principal part of ink discharges for a plane discharge type ink jet recording head having the ink flow paths processed and formed by the laser processing method in accordance with the seventh embodiment of the present invention.

Now, the description will be made of the present embodiment in accordance with FIGS. 14A and 14B.

FIG. 14A is the view observed from the ink discharge surface side. FIG. 14B is a cross-sectional view, taken line 14B—14B in FIG. 14A. The blue polysulfone plate 1430, in which a blue dye is dispersed and mixed with the light absorptance of approximately 60% in the near infrared region of 7.75 nm which is the wavelength range of the laser beams to be used, is adhesively bonded to the silicon IC base plate 1410 having the ink discharge pressure generating elements 1411 installed thereon. Then, on the blue polysulfone plate 1430, there is prepared a blank to which is adhesively bonded the colorless polysulfone plate 1420 having the light absorptance of 0.5% or less in the near infrared region of 7.75 nm which is the wavelength region of the laser beams to be used. Thus, the laser beams of 7.75 nm wavelength of the near infrared ultrashort pulse (one picosecond or less) are allowed to pass the colorless polysulfone plate 1420 and irradiate on the predetermined positions of the blue polysulfone plate 1430. In this manner, the ink liquid chamber 1433, the ink flow paths 1432, and the ink buffer chamber 1431 are processed and formed with the method described in conjunction with FIG. 13.

Here, the details of the laser energy transfer in use are: near infrared rays having the wavelength of 7.75 nm; the temporal width of radiated pulse is 150 femtoseconds per pulse; the light energy of laser radiation is allowed to pass a mask pattern with the energy density of approximately 50 megawatts/cm$^2$ by irradiating the laser beams which are reduced to the 400 microjouls per pulse on an area of 20 mm×170 mm of the mask 136, and then, the mask pattern image is reduced within an area or approximately 4 mm×34 mm through a 1/5 projection of the projection lens. In this manner, the laser is radiated on the work piece with the energy density of approximately one gigawatt/cm$^2$ due to the energy loss incurred when passing the mask and the optical system. As described earlier, the light absorptance of the colorless polysulfone resin is approximately 0.1% with the wavelength of 7.75 nm. The light absorptance of the blue polysulfone resin is approximately 60% with the wavelength of 7.75 nm. Then, the threshold value of ablation processing of polysulfone resin is the energy density of approximately 15 megawatts/cm$^2$. Therefore, the threshold value of ablation processing of the colorless polysulfone resin by laser radiation is approximately 15 gigawatts/cm$^2$, while that of the blue polysulfone resin is approximately 0.025 gigawatts/cm$^2$. As a result, the laser beams having the energy density of approximately one gigawatt/cm$^2$, which are radiated on the work piece are allowed to pass the colorless polysulfone plate 1420, but absorbed by the blue polysulfone plate 1430, hence processing the blue polysulfone plate 1430 by the predetermined pattern.

After the blue polysulfone plate 1430 and the colorless polysulfone plate 1420 are bonded to the silicon IC base plate 1410 having the ink discharge pressure generating elements 1411 installed thereon, the ink liquid chamber 1433, the ink flow paths 1432, and the ink buffer chamber 1431 are process and formed. In this case, the laser processing is performed with the ink discharge pressure generating elements 1411 and the pattern of the silicon IC base plate 1410 as the criteria therefor. Thus, unlike the case where the silicon base plate 1410 is aligned and bonded after the ink liquid chamber 1433, the ink flow paths 1432, and the ink buffer chamber 1431 have been processed and formed on the blue polysulfone plate 1430, it becomes possible to eliminate the bonding alignment errors so that the ink liquid chamber 1433, the ink flow paths 1432, and the ink buffer chamber 1431 can be incorporated in higher precision.

The principal part of the ink discharge portion of an ink jet recording head of the fifth to seventh embodiments described above can be processed as an ink jet recording head through the steps given below.

While an electric base plate for which the terminals for use of ink discharge pressure generating elements are pattern is bonded, an aluminum or alumina ceramics base plate is bonded to the silicon IC base plate for heat radiation use. Then, the holder that holds each of the members and the ink tank used for ink supply are bonded to assemble an ink jet recording head, hence providing a unit that functions as an ink jet recording head.

Eighth Embodiment

Figure 15:
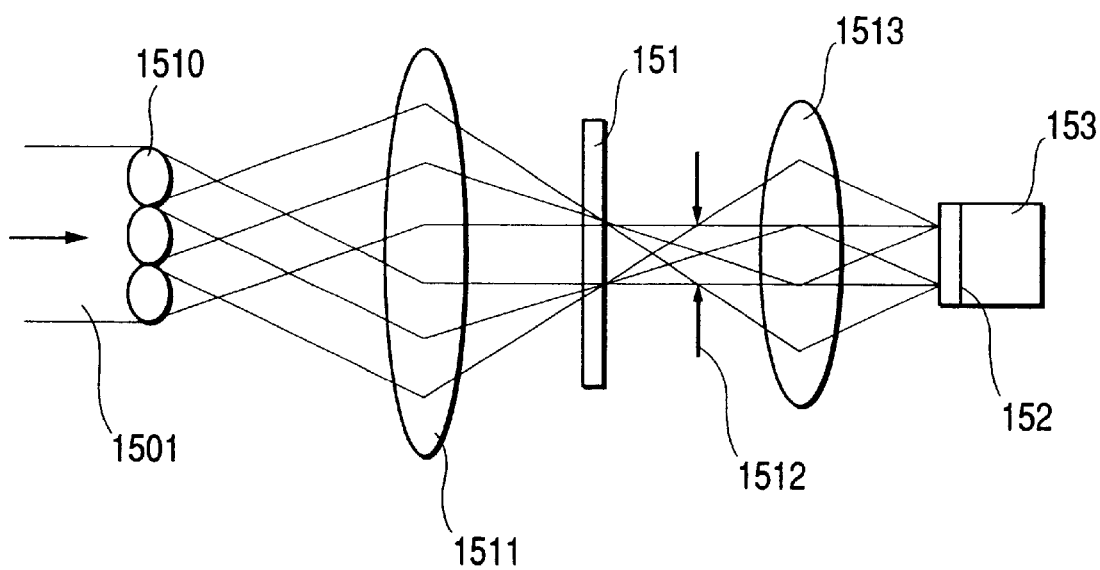
FIG. 15 is a view which schematically shows the mask pattern projection optical system of a laser processing apparatus in accordance with an eighth embodiment of the present invention.

FIG. 15 is a view which schematically shows the optical path of the mask pattern projection optical system of a laser processing apparatus in accordance with an eighth embodiment of the present invention.

For the present embodiment, the laser oscillator uses laser that oscillates in a pulse radiation time of one picosecond or less. More specifically, the radiated laser beams are near infrared rays of 7.75 nm wavelength, and the temporal width of radiated pulse is 150 femtoseconds per pulse. The light energy of the laser radiation is 15 $\mu$J per pulse. Also, an orifice plate of polysulfone of 50 $\mu$m thick is used for the main body of an ink jet recording head. Ink discharge ports are formed for this orifice plate.

In FIG. 15, the structure is arranged to induce the beam flux 1501 oscillated from the laser main body (not shown) into the fly eyes or some other optical integrator 1510 in order to divide the incident laser beam flux into plural numbers, and then, to superpose the divided beam fluxes by the field lens 1511 on the mask 151 having a plurality of opening patterns formed at predetermined pitches, thus correcting the illuminating intensity of laser substantially equal to illuminate the mask.

Also, the field lens 1511 projects the dot images converged on plural points by use of the fly eye lenses 1510 on the positions of aperture 1512 of the mask pattern projection lens 1513, thus forming the Koehler illumination system.

For an optical system of the kind, the laser beams are illuminated on the mask 151. Then, the mask pattern formed on the mask 151 is projected and focused on the surface of the orifice plate 152 of the ink jet recording head 153, which is a work piece, by use of the projection focusing lens 1513. In this way, the ink discharge ports are processed by means of the laser oscillation.

The ink discharge ports are processed by the laser processing apparatus described above as a work piece. Now, the details thereof will be described in conjunction with FIG. 16.

Figure 16:
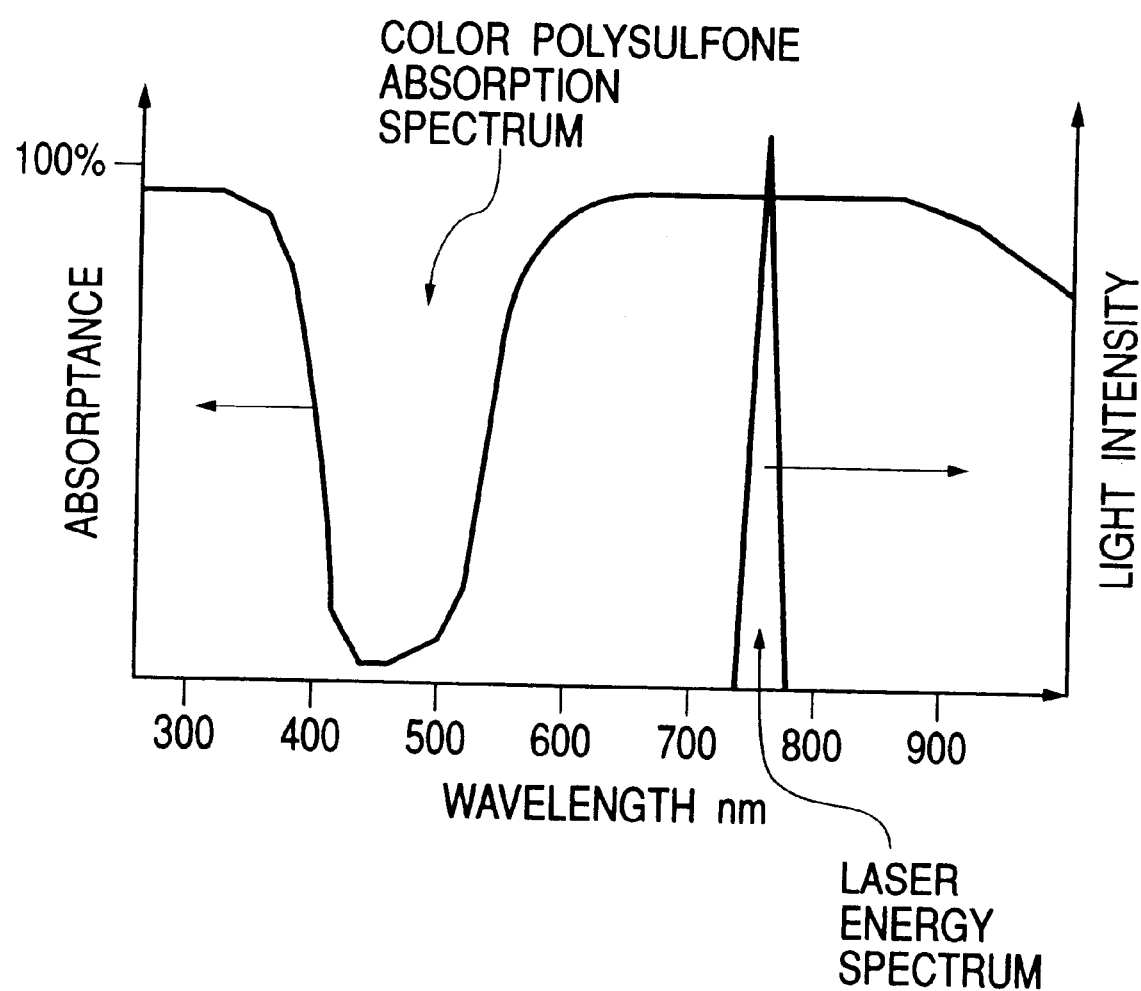
FIG. 16 is a view which shows the correlations between the laser oscillation frequency and the absorptive spectrum of a work piece for the illustration of the processing method in accordance with the eighth embodiment of the present invention.

As shown in FIG. 16, a work piece, polysulfone resin, is at first mixed with blue dye using the radiation of laser beams, which is near infrared rays of 7.75 nm wavelength with a light source having the temporal width of oscillating radiation of 150 femtoseconds per pulse, thus coloring the polysulfone resin entirely in blue up to the interior thereof.

The orifice plate, which is formed by the aforesaid polysulfone in a thickness of 50 $\mu$m, is used as the main body of an ink jet recording head. Then, the ink discharge nozzles are formed on the orifice plate by use of the aforesaid optical system.

Then, as compared with the case where the ink discharge ports are formed by the radiation of laser of approximately 2000 pulses for an orifice plate formed by the orifice plate of original color, that is, transparent and colorless, the ink discharge ports can be formed by the radiation of laser of approximately 100 pulses when the polysulfone colored in blue is used for the orifice plate as described above. Therefore, it becomes possible to obtain the processing efficiency almost as much as 20 times.

In this case, not only the enhancement of the processing efficiency is an advantage, but also, it becomes possible to expand the processing area larger in the same processing efficiency by the application of the same laser oscillating energy.

Now, in accordance with FIGS. 17A to 17C, the description will be made of an ink jet recording head manufactured by the application of the laser processing method of the first embodiment described above.

Figure 17C:
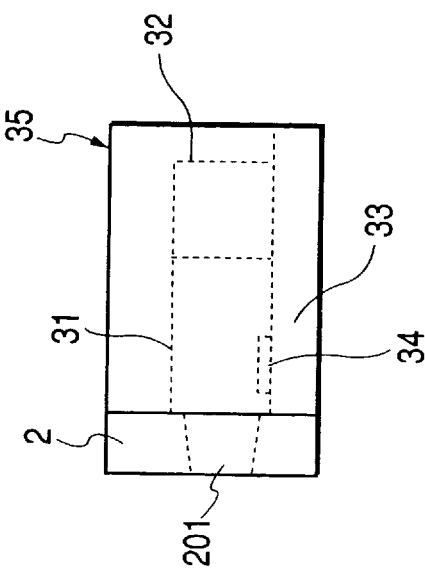
FIGS. 17A, 17B and 17C are views which schematically illustrate an ink jet recording head manufactured by the application of the laser processing method in accordance with the embodiments of the present invention.
Figure 17A:
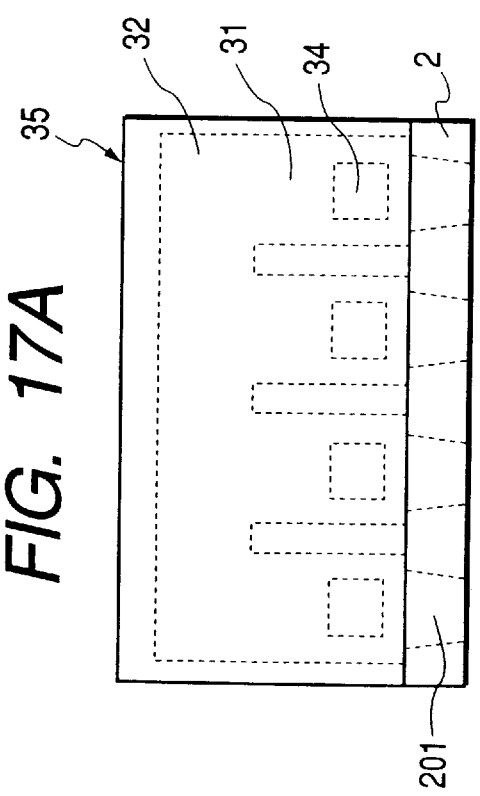
Figure 17B:
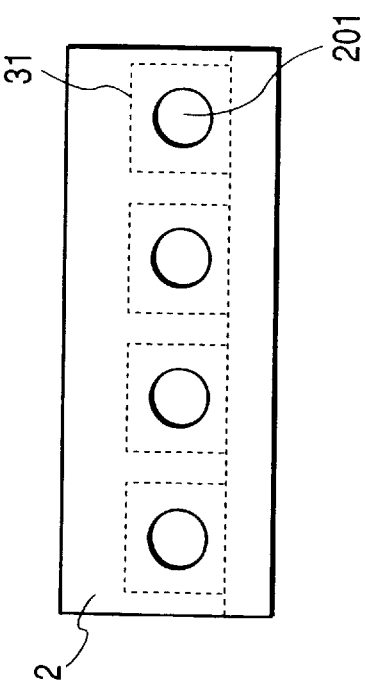

In FIGS. 17A to 17C, a reference numeral 33 designates a base plate. On this base plate, the ink discharge pressure elements 34, such as electrothermal transducing elements, electromechanical transducing elements, are arranged for discharge ink.

Each of the ink discharge pressure generating elements 34 is arranged in each of the ink flow paths 31 communicated with the discharge ports 201. Each of the ink flow paths 31 is communicated with the common liquid chamber 32.

With the ink supply port of the common liquid chamber 32, an ink supply tube (not shown) is connected to supply ink from an ink tank through the ink supply tube.

Also, a reference numeral 35 designates a ceiling plate having the recessed portion to form the ink flow paths 31 and the common liquid chamber 32, which is bonded to the base plate 33 to form the ink flow paths 31 and the common liquid chamber 32.

Further, on the edge side of the ink flow paths of the bonded body of the base plate 33 and the ceiling plate 35, the discharge port plate 2 (hereinafter referred to an orifice plate) is arranged with discharge ports 201.

An ink jet recording head of the kind can be manufactured as given below.

In other words, the heaters 34 which are heat generating resistive elements for use of ink discharge pressure generating, the integrated circuit, such as shift registers, (not shown), and the electric wiring are patterned on the silicon base plate to form the base plate 33, and at the same time, the ceiling plate 35 is produced by a silicon plate where the recessed portion that becomes the ink flow paths 31 and the ink liquid chamber 32, and an ink supply port (not shown) are formed by means of the chemical etching.

After that, the base plate 33 and the ceiling plate 35 are aligned so that the edge face on the ink discharge side and the arrangement of the ink flow paths 31 and heaters 34 are in agreement, and then, bonded together. After this alignment and bonding operation, the orifice plate 2 is aligned with and bonded to the bonded body of the ceiling plate 35 and the base plate 33 so that the nozzles (discharge ports) 201 are set on the predetermined position on the edge face on the ink discharge side thereof.

Thereafter, the terminals for use of heater driving (not shown) are patterned and bonded to the electric base plate, and at the same time, the base plate formed by aluminum, ceramics, or the like is bonded to the base plate 33. Then, the holder that holds each of the members, and the ink tank for supply ink are connected to assemble an ink jet recording head.

With the ink jet recording head thus manufactured, it becomes possible to prevent the occurrence of the positional fluctuation of ink discharge direction due to the manufacture in which the discharge ports are not processed to be evenly directed.

In accordance with the present embodiment, an orifice plate formed by polysulfone of 50 μm thick is used for the main body of an ink jet recording head. Then, using the aforesaid optical system ink discharge ports are formed for the orifice plate with the radiation of laser beams which are near infrared rays of 7.75 nm wavelength having the temporal width of radiation pulse being 150 femtoseconds/cm$^2$ per pulse; the light energy of laser radiation being 15 μJ per pulse; and the radiated energy density (fluence) being approximately 1 J/cm$^2$ per pulse.

Here, 50 ink jet recording heads are manufactured to observe the shape of discharge ports, with the result that all the discharge ports present clean and smooth edges with the formation of ink discharge ports arranged in parallel in high precision, and that the variation of the aperture diameter of each discharge port on the edge portion on the ink discharging side is significantly reduced as compared with the conventional one.

Also, the actual printing is performed by use of the ink jet recording heads thus manufactured, with the result that evenly lined print dots are recorded with clear and smooth shape of dots, thus obtaining images of excellent print quality.

Here, in accordance with the above description, an example is shown for the method for forming ink discharge ports. However, the present invention is not necessarily limited thereto. It is of course possible to demonstrate the same effect when the ink flow paths, the ink liquid chamber, and the ink supply port are processed.

Further, in accordance with the above description, an ink jet recording head is described. However, the present invention is not necessarily limited thereto. For example, the invention is preferably applicable to the laser processing related to the micromachining of a semiconductor base plate or the like. Therefore, it is to be understood that these are included in the present invention.

As described above, in accordance with the present invention, it is possible to perform a highly precise processing without creating by-product, and fundamentally prevent the converted thermal energy from being accumulated on a work piece, such as resin, during the operation of laser processing.

Also, in accordance with the present invention, it is possible to significantly increase the temporal energy density during the laser processing. Then, a work piece, such as resin, can be processed by ablation with an extremely small amount of light energy.

Also, in accordance with the present invention, it becomes possible to omit the removal process of by-product which is required for the conventional art, because there is almost no creation of by-product during the operation of laser processing. Therefore, the productivity of ink jet recording heads is enhanced significantly.

Also, in accordance with the present invention, it is possible to solve the problem that a work piece is caused to be thermally expanded during process so as to degrade the processed precision or the work piece is caused to be fused partly, because the required process is over before the thermal energy, which has been converted from the light energy of laser beams radiated on the work piece, such as resin, is accumulated thereon. Therefore, a highly precise processing is possible to enhance the performance of an ink jet recording head significantly.

Also, the process material is not necessarily limited to resin. Because the processing step is completed before heat dispersion advances from beam radiation even when a material having a higher heat transfer coefficient, such as metal, is processed. As a result, the ablation processing can be effectuated without conditioning any liquid phase.

Further, it becomes possible to effectuate the ablation processing for a material having a high light transmitting efficiency (transmittancy), such as quartz, optical crystal, or glass material, even if the light absorptance is small, because the temporal energy density is high.

In other words, the degree of material selection freedom becomes higher when considering the structural members for an ink jet recording head.

Also, in accordance with the present invention, a material having a small linear expansion coefficient can be used. Therefore, it becomes possible to prevent the deviation from taking place on the contact surface of each member due to shearing force.

Also, with the use of ceramics material or glass material, it is possible to manufacture an ink jet recording head having excellent durability and storage capability which is not easily corroded even by ink having strong alkaline property. Furthermore, with the use of semiconductor material, a structural member can be formed directly on an integrated circuit. Then, if a high fusion point material, such as ceramics, is used for the discharge port plate, it becomes possible to give a higher heat treatment, such as a water-repellent process of the surface of ink discharge ports, among some others.

Also, in accordance with the present invention, the different materials of two kinds or more can be processed by sublimation almost simultaneously in one and the same process. Further, even if the difference of the linear expansion coefficient is large between different materials of two kinds or more, it is possible for the present invention to suppress peeling off between those different materials due to the stress caused by the thermal expansion thereof, because it is made difficult to transfer heat by the present invention during the operation of the ablation processing as compared with the conventional one. As a result, when a precise structure should be formed on a work piece formed by plural kinds of materials, it is possible to implement the laser processing method with simply processing steps or a method for manufacturing an ink jet recording head using such laser processing method, and to provide an ink jet recording head manufactured by such method of manufacture.

Also, in accordance with the present invention, the ultraviolet rays are not necessarily needed for use of the light wavelength of radiated laser by the pulse oscillating time of one picosecond or less. If only the wavelength can be absorbed by a work piece, visible rays or infrared rays can be used. The temporal energy density is extremely high so that material can be sublimated for a short period of processing, and that the ablation processing is effectuated without conditioning the liquid phase.

Also, with a method for manufacturing an ink jet recording head structured by the laser processing method, it becomes possible to perform the ablation processing almost simultaneously in one processing step using the aforesaid laser processing method even for the structural member of the recording head formed by inorganic material, glass material, metallic material, semiconductor material, or the arbitrary combination of these materials, not necessarily limited to the resin material, such as polyimide, polysulfone, which is conventionally used for the structural member of the ink discharge ports, the ink flow paths, the ink liquid chamber, or the ink supply port of an ink jet recording head in general. Therefore, it becomes possible to provide more freedom of complex selection of material for the structural member of the ink discharge ports, the ink flow paths, the ink liquid chamber or ink supply port.

Also, for example, if a material having a small thermal expansion, which is made available by the complex material formed by metallic and resin materials or glass and resin materials, is used for the structural member of the orifice plate or ink flow paths, it becomes possible to prevent the deviation of the contact face of each member due to shearing force. Further, if an ink jet recording head or a printer is formed by these materials which are not easily affected by temperature changes (environmental changes), it becomes possible to transport them on board a ship even directly under the equator. Thus, it is possible to attempt the reduction of distribution costs.

Also, by the use of ceramics or glass complex material, it is possible to manufacture an ink jet recording head excellent in durability and storage capability which is not easily eroded even by ink having strong alkaline property.

Also, in accordance with the present invention, it becomes possible to perform sublimating process selectively for the inner portion of a work piece, because the process of sublimating process begins with the region where it exceeds the threshold value of ablation processing of the work piece by converging light more than the predetermined energy density inside the work piece which is transparent in terms of the light wavelength of laser beams as described earlier. Hence it is made possible to simplify the alignment process, as well as to implement making the positional precision higher for the inner structural members or the like, to provide a laser processing method whereby to attempt reducing the costs of manufacture or a method for manufacturing an ink jet recording head using such laser processing method, and an ink jet recording head manufactured by such method of manufacture.

Also, in accordance with the present invention, if a method is structured for manufacturing an ink jet recording head using the aforesaid layer processing method, it becomes possible not only to suppress the alignment errors caused by assembling structural members of the ink jet recording head, as well as the degradation of the ink discharge characteristics caused by the bonding deformation, but also, to draw around ink flow paths three-dimensionally inside a resin work piece, such as polysulfone or polyimide. In this manner, the YMC (yellow, magenta, and cyan) circulating one-dimensional arrangement of discharge nozzles is connected respectively with the YMC three-color ink liquid chambers. Thus, it is possible to form an ink jet recording head having the arrangement of adjacent discharge cells for three colors. Also, not only with YMC three-color arrangement, but also, for the YMCK (yellow, magenta, cyan, and black) four-color arrangement, it is possible to form an ink jet recording head having the arrangement of adjacent discharge cells for four colors by connecting the YMCK circulating one-dimensional arrangement of nozzles respectively with the YMCK four-color ink liquid chambers. Therefore, it is unnecessary to make resist adjustment between each of the respective colors for recording executed by an ink jet recording head of the kind. There is no possibility that color deviation or color phase changes occur, hence making it unnecessary to provide any complicated color resist correction function or resist matching adjustment between each of the respective colors. Then, images can be printed with stabilized color reproduction.

Also, in accordance with the present invention, it is possible to make arrangement so that laser beams can be radiated on a material (B) having a higher light absorptance with respect to the light wavelength thereof, which is positioned inside a work piece after having passed a material (A) having a lower light absorptance than that of the material (B), which is almost transparent with respect to the light wavelength thereof as described earlier. In this manner, a structural member can be formed on the material (B) to making the alignment process simplified. Also, it becomes possible to implement a laser processing method capable of making the positional precision or the like higher for the inner structural members or reducing the costs of manufacture, among some others, or implement a method for manufacturing an ink jet recording head using such laser processing method, as well as an ink jet recording head manufactured by such method of manufacture.

Also, in accordance with the present invention, with the method for manufacturing an ink jet recording head structured by use of the laser processing method described above, it becomes possible to form ink flow paths or the like inside after an ink jet recording head has been assembled. As a result, it is possible to suppress the alignment errors due to assembling, and the degradation of ink discharge characteristics due to bonding deformation as well.

Also, in accordance with the present invention, the enhancement of processing efficiency can be attempted by forming a work piece to be able to absorb laser radiation energy.

What is claimed is:

1. A laser processing method for performing laser ablation processing by irradiating laser beam to a work piece comprising the steps of:

using laser beam of plural pulses having extremely large spatial and temporal energy density radiated from a laser oscillator as said laser beam oscillating at the pulse radiation time of one picosecond or less to converge beam with more than predetermined energy density inside a transparent work piece with respect to the light wavelength of said laser beam; and processing said work piece by sublimation, wherein when a structural member is processed by sublimation inside said work piece at the time of said work piece being processed by sublimation, a discharge port is formed in advance to discharge to the outside the by-product created by sublimation and evaporation caused by said processing, and then, said structural member is processed.

2. A laser processing method according to claim 1, wherein when said structural member is processed, the structural member is processed in a position close to said discharge port.

3. A laser processing method according to either one of claims 1 or 2, wherein said work piece is colored by mixing therein a dye for absorbing wavelength in a domain corresponding to the oscillating wavelength of said laser beam, and processed.

4. A laser processing method according to either one of claims 1 or 2, wherein the wavelength of said laser beam is within a domain of 350 to 1000 mm.

5. A laser processing method according to either one of claims 1 or 2, wherein the pulse radiation time of said laser beam is 500 femtoseconds or less.

6. A laser processing method according to either one of claims 1 or 2, wherein said laser oscillator is a laser oscillator provided with a spatial compression device for propagating beam.

7. A laser processing method according to claim 6, wherein said spatial compression device for propagating beam comprises chirping pulse generating means and longitudinal mode synchronous means utilizing light wavelength dispersion characteristics.

8. A laser processing method according to claim 6, wherein said spatial compression device for propagating beam is structured using chirping pulse generating means and a longitudinal mode synchronous method utilizing a light wavelength dispersion characteristic of diffraction phase grating.

9. A method for manufacturing an ink jet recording head having a member for forming at least a part of ink passage for ink to flow to be formed in a transparent ink flow path formation member and processed by laser beam, provided with an ink discharge port for discharging ink droplets adhering to a recording medium: a liquid chamber for retaining ink to be supplied to said discharge port; an ink flow path communicated with said discharge port and said liquid chamber; an energy generating element arranged for a part of said ink flow path for generating energy for discharging ink; and an ink supply port for supplying ink from the outside into said liquid chamber, comprising the steps of:

using laser beam of plural pulses having extremely large spatial and temporal energy density radiated from a laser oscillator as said laser beam oscillating at the pulse radiation time of one picosecond or less to converge beam with more than predetermined energy density inside the transparent ink flow path formation member with respect to the light wavelength of said laser beam; and processing an ink flow path and others by sublimation, wherein when said ink flow path and others are processed, a discharge port is formed in advance to discharge to the outside the by-product created by the sublimation and vaporization of said processing, and then, said ink flow path and others are processed.

10. A method for manufacturing an ink jet recording head having a member for forming at least a part of ink passage for ink to flow to be formed by a substantially transparent material (A) having low light absorptance of laser beam, and a material (B) having higher light absorptance than that of said material (A) and positioned inside a work piece, and processed by the laser processing method, provided with an ink discharge port for discharging ink droplets adhering to a recording medium; a liquid chamber for retaining ink to be supplied to said discharge port; an ink flow path communicated with said discharge port and said liquid chamber; an energy generating element arranged for a part of said ink flow path for generating energy for discharging ink; and an ink supply port for supplying ink from the outside into said liquid chamber, comprising the steps of:

using laser beam of plural pulses having extremely large spatial and temporal energy density radiated from a laser oscillator as said laser beam oscillating at the pulse radiation time of one picosecond or less to pass beam through said material (A) having low light absorptance of said laser beam, and radiate beam on said material (B) having higher light absorptance than that of said material (A) and positioned inside said work piece;

processing said material (B) by sublimation, wherein when said ink flow path and others are processed, a discharge port is formed in advance to discharge to the outside the by-product created by the sublimation and vaporization of said processing, and then, said ink flow path and others are processed.

11. A method for manufacturing an ink jet recording head according to either claim 9 or 10, wherein when said ink flow path and others are processed, the ink flow path and others are processed in a position close to said discharge port.

12. An ink jet recording head having a member for forming at least a part of ink passage to be formed in a transparent ink flow path formation member and processed by laser beam, provided with an ink discharge port for discharging ink droplets adhering to a recording medium; a liquid chamber for retaining ink to be supplied to said discharge port; an ink flow path communicated with said discharge port and said liquid chamber; an energy generating clement arranged for a part of said ink flow path for generating energy for discharging ink; and an ink supply port for supplying ink from the outside into said liquid chamber, comprising:

said member processed by sublimation by use of laser beam of plural pulses having extremely large spatial and temporal energy density radiated from a laser oscillator as said laser beam oscillating at the pulse radiation time of one picosecond or less to be converged with more than predetermined energy density inside the transparent ink flow path formation member with respect to the light wavelength of said laser beam, wherein when said ink flow path and others are processed, a discharge port is formed in advance to discharge to the outside the by-product created by the sublimation and vaporization of said processing, and then, said ink flow path and others are processed.

13. An ink jet recording head according to claim 12, wherein the ink flow path and others are processed in a position close to said discharge port, when said ink flow path and others are processed.

14. An ink jet recording head according to claim 12, further comprising said member colored by mixing therein a dye for absorbing wavelength in a domain corresponding to the oscillating wavelength of said laser beam, and processed.

15. A laser processing method for performing laser ablation processing by irradiating laser beam to a work piece comprising the steps of:

preparing laser beam of plural pulses having extremely large spatial and temporal energy density radiated from a laser oscillator as said laser beam oscillating at the pulse radiation time of one picosecond or less;

preparing the work piece formed from a transparent material with respect to the light wavelength of said laser beam, having a processing portion inside thereof and a discharge port for communicating the processing portion with the outside; and laser ablation processing said processing portion by irradiating said laser beam through said transparent material to converge beam with more than predetermined energy density, wherein said discharge port is formed to discharge to the outside the by-product created at the processing portion by said laser ablation processing.

16. A laser processing method according to claim 15, wherein when said processing portion is processed, the processing portion is processed in a position close to said discharge port.

17. A laser processing method according to either one of claims 15 or 16, wherein said work piece is colored by mixing therein a dye for absorbing wavelength in a domain corresponding to the oscillating wavelength of said laser beam, and processed.

18. A laser processing method according to either one of claims 15 or 16, wherein the wavelength of said laser beam is within a domain of 350 to 1000 mm.

19. A laser processing method according to either one of claims 15 or 16, wherein the pulse radiation time of said laser beam is 500 femtoseconds or less.

20. A laser processing method according to either one of claims 15 or 16, wherein said laser oscillator is a laser oscillator provided with a spatial compression device for propagating beam.

21. A laser processing method according to claim 20, wherein said spatial compression device for propagating beam comprises chirping pulse generating means and longitudinal mode synchronous means utilizing light wavelength dispersion characteristics.

22. A laser processing method according to claim 20, wherein said spatial compression device for propagating beam is structured using chirping pulse generating means and a longitudinal mode synchronous method utilizing a light wavelength dispersion characteristic of diffraction phase grating.

23. A method for manufacturing an ink jet recording head having a member for forming at least a part of ink passage for ink to flow to be formed in a transparent ink flow path formation member and processed by laser beam, provided with an ink discharge port for discharging ink droplets adhering to a recording medium; a liquid chamber for retaining ink to be supplied to said discharge port; an ink flow path communicated with said discharge port and said liquid chamber; an energy generating element arranged for a part of said ink flow path for generating energy for discharging ink; and an ink supply port for supplying ink from the outside into said liquid chamber, comprising the steps of:

preparing laser beam of plural pulses having extremely large spatial and temporal energy density radiated from a laser oscillator as said laser beam oscillating at the pulse radiation time of one picosecond or less;

preparing the transparent ink flow path formation member, which is formed from a transparent material with respect to the light wavelength of said laser beam; and laser ablation processing an ink flow path and others by irradiating said laser beam through said transparent material to converge beam with more than predetermined energy density, wherein said discharge port is formed to discharge to the outside the by-product created at the ink flow path and others by said laser ablation processing.

24. A method for manufacturing an ink jet recording head according to claim 23, wherein when said ink flow path and others are processed, the ink flow path and others are processed in a position close to said discharge port.

* * * * *

UNITED STATES PATENT AND TRADEMARK OFFICE
CERTIFICATE OF CORRECTION

PATENT NO.      : 6,693,656 B1
DATED           : February 17, 2004
INVENTOR(S)     : Jun Koide It is certified that error appears in the above-identified patent and that said Letters Patent is hereby corrected as shown below:

<u>Title page,</u>
Item [56], References Cited, U.S. PATENT DOCUMENTS, "Hosak et al." should read -- Hosaka et al. --.

<u>Column 1,</u>
Line 37, "photodecompotion" should read -- photodecomposition --.

<u>Column 3,</u>
Line 21, "for a" should read -- for --.
Line 49, "of-forming" should read -- of forming --.

<u>Column 4,</u>
Line 15, "bemas" should read -- beams --.

<u>Column 6,</u>
Line 60, "other" should read -- others --.

<u>Column 7,</u>
Line 20, "charping" should read -- chirping --.

<u>Column 12,</u>
Line 48, "from" should read -- form --.
Line 49, "insider" should read -- inside --.

<u>Column 13,</u>
Line 34, "mm2)," should read -- $mm^2$), --.
Line 42, "provides" should read -- provide --.

<u>Column 14,</u>
Line 14, "beans" should read -- beams --.

UNITED STATES PATENT AND TRADEMARK OFFICE
CERTIFICATE OF CORRECTION

PATENT NO.      : 6,693,656 B1
DATED           : February 17, 2004
INVENTOR(S)     : Jun Koide It is certified that error appears in the above-identified patent and that said Letters Patent is hereby corrected as shown below:

<u>Column 16,</u>
Line 23, "o the" should read -- of the --.

<u>Column 18,</u>
Line 10, "filed" should read -- field --.
Line 25, "formation a" should read -- formation of a --.

<u>Column 19,</u>
Line 67, "7.75" should read -- 775 --.

<u>Column 20,</u>
Lines 4, 59 and 67, "7.75" should read -- 775 --.
Line 14, "process" should read -- processed --.

<u>Column 22,</u>
Line 13, "taken" should read --taken from--.
Lines 17, 24, 25, 34, 48 and 50, "7.75" should read -- 775 --.

<u>Column 23,</u>
Lines 34 and 66, "7.75" should read -- 775 --.

<u>Column 24,</u>
Line 45, "to" should read -- to as --.

<u>Column 25,</u>
Line 18, "7.75" should read -- 775 --.

<u>Column 28,</u>
Line 67, "mm" should read -- nm --.

UNITED STATES PATENT AND TRADEMARK OFFICE
CERTIFICATE OF CORRECTION

PATENT NO. : 6,693,656 B1
DATED : February 17, 2004
INVENTOR(S) : Jun Koide

It is certified that error appears in the above-identified patent and that said Letters Patent is hereby corrected as shown below:

Column 29,
Line 24, "medium:" should read -- medium; --.
Line 67, "piece;" should read -- piece; and --.

Column 31,
Line 10, "mm" should read -- nm --.

Signed and Sealed this

Fourteenth Day of September, 2004

JON W. DUDAS
*Director of the United States Patent and Trademark Office*